United States Patent [19]
Nakanishi

[11] Patent Number: 5,849,339
[45] Date of Patent: Dec. 15, 1998

[54] APPARATUS FOR PRODUCING BIODEGRADABLE RESIN FOAM

[75] Inventor: Motoyasu Nakanishi, Fuji, Japan

[73] Assignee: Suzuki Sogyo Co., Ltd., Shizuoka, Japan

[21] Appl. No.: 734,957

[22] Filed: Oct. 23, 1996

Related U.S. Application Data

[62] Division of Ser. No. 274,038, Jul. 12, 1994, Pat. No. 5,602,188.

[30] Foreign Application Priority Data

| Jul. 13, 1993 | [JP] | Japan | 5-195378 |
| Jul. 16, 1993 | [JP] | Japan | 5-199214 |
| Jul. 16, 1993 | [JP] | Japan | 5-199215 |
| Jul. 20, 1993 | [JP] | Japan | 5-201094 |
| Jul. 20, 1993 | [JP] | Japan | 5-201095 |
| Aug. 25, 1993 | [JP] | Japan | 5-232339 |
| Oct. 29, 1993 | [JP] | Japan | 5-294198 |
| Oct. 29, 1993 | [JP] | Japan | 5-294199 |
| Oct. 29, 1993 | [JP] | Japan | 5-294200 |

[51] Int. Cl.⁶ ............................................. B29C 49/02
[52] U.S. Cl. ......................... 425/4 R; 264/51; 264/55; 425/73; 425/557
[58] Field of Search .......................... 425/4 R, 73, 149, 425/557, 574, 547, DIG. 119; 264/98.9, 46.1, 51, 53, 55

[56] References Cited

U.S. PATENT DOCUMENTS

| 4,208,177 | 6/1980 | Allen | 425/404 |
| 4,273,793 | 6/1981 | Fariel et al. | 426/572 |
| 4,478,566 | 10/1984 | Prusak et al. | 425/149 |
| 4,479,914 | 10/1984 | Baumrucker | 264/45.5 |
| 5,074,770 | 12/1991 | Graefe | 425/117 |
| 5,252,271 | 10/1993 | Jeffs | 264/54 |
| 5,272,181 | 12/1993 | Boehmer et al. | |
| 5,308,879 | 5/1994 | Akamatu et al. | 571/84.1 |
| 5,360,586 | 11/1994 | Wyatt et al. | 264/54 |
| 5,441,680 | 8/1995 | Gvergor | 264/40.1 |
| 5,589,202 | 12/1996 | Okano et al. | 425/73 |
| 5,665,395 | 9/1997 | Avichraud et al. | 425/73 |

FOREIGN PATENT DOCUMENTS

| 0376201 | 7/1990 | European Pat. Off. . |
| 0 535 994 A1 | 4/1993 | European Pat. Off. . |
| 0 539 604 A1 | 5/1993 | European Pat. Off. . |
| 0587078 | 3/1994 | European Pat. Off. . |
| 0 594 977 A1 | 5/1994 | European Pat. Off. . |
| 0 601 390 A1 | 6/1994 | European Pat. Off. . |
| 2156558 | 6/1973 | France . |
| 4-356538 | 12/1992 | Japan . |
| 6-16857 | 1/1994 | Japan . |
| 1372959 | 11/1974 | United Kingdom . |
| 2164291 | 3/1986 | United Kingdom . |

*Primary Examiner*—Patrick Ryan
*Assistant Examiner*—Ivrie A. Schwartz
*Attorney, Agent, or Firm*—Wenderoth, Lind & Ponack, L.L.P.

[57] ABSTRACT

Foam forming techniques are capable of permitting foaming of biodegradable resin to be positively and uniformly accomplished to provide a biodegradable resin foam with satisfactory quality. The biodegradable resin including foam is made of biodegradable resin a main biodegradable resin ingredient of 100° C. or more in melting point and a low-melting biodegradable resin ingredient of 100° C. or less in melting point. The biodegradable resin foam is produced by placing a starting material of at least biodegradable resin and a substantial amount of moisture in a heated and pressurized environment, releasing the starting material from the environment to foam the biodegradable resin, and subjecting the foamed resin to forming by a forming mold. An apparatus for producing the foamed biodegradable resin foam includes a pressure adjusting chamber, an air-permeable forming mold, a pressure reducing tank and an injection machine.

15 Claims, 27 Drawing Sheets

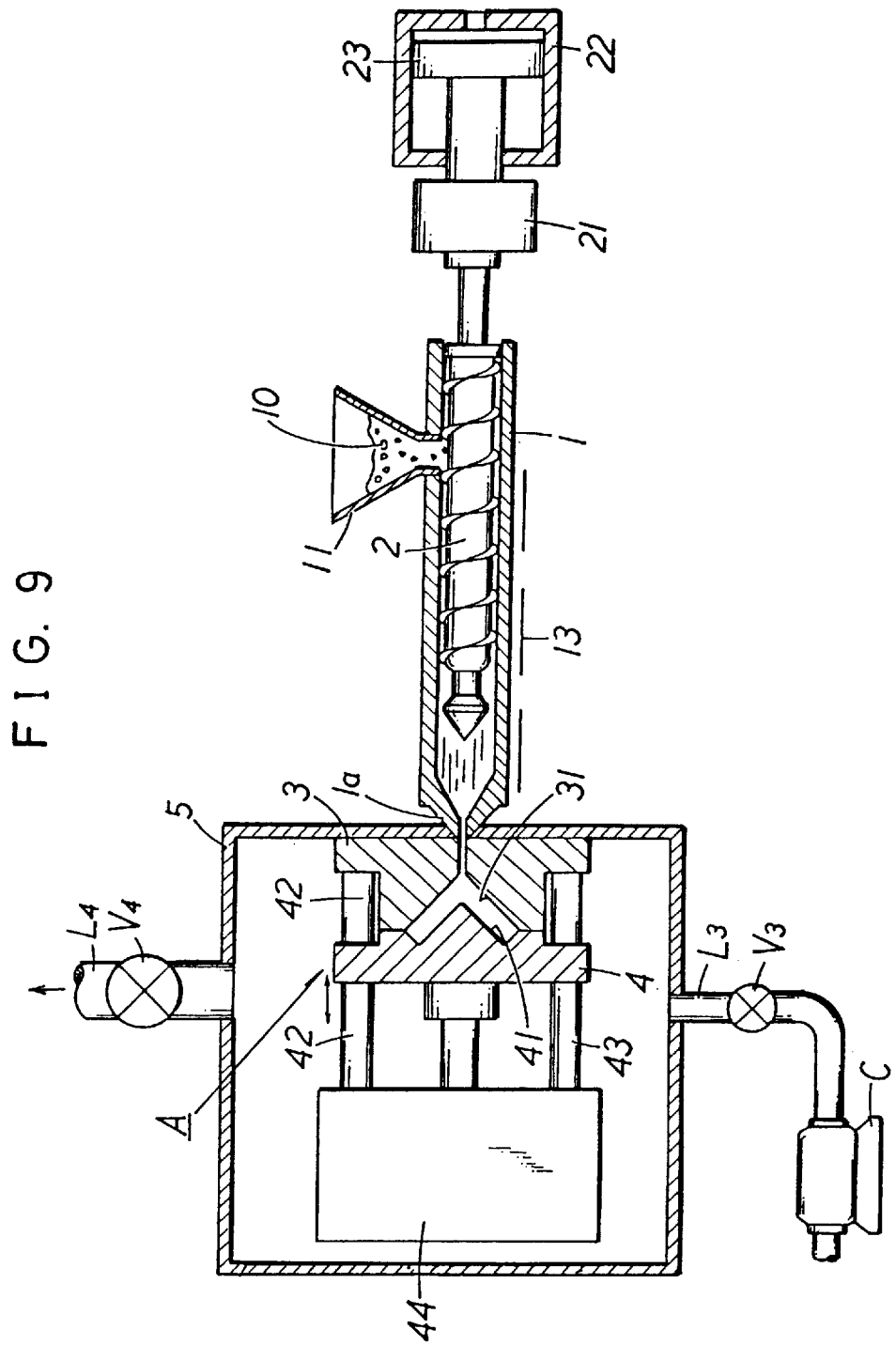

F I G. 10(a)
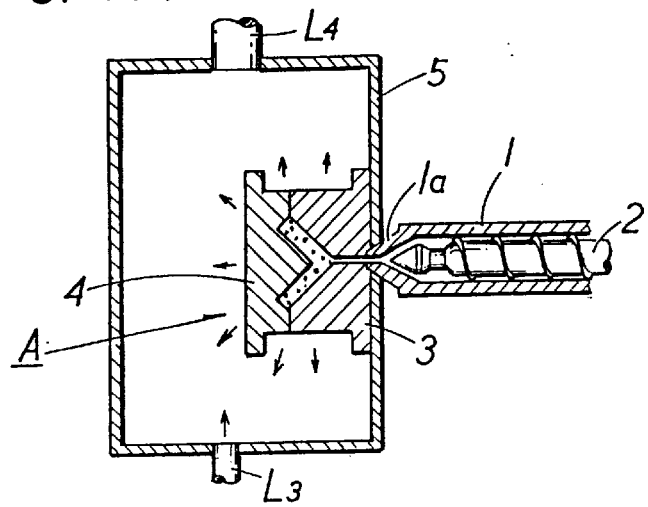
F I G. 10(b)
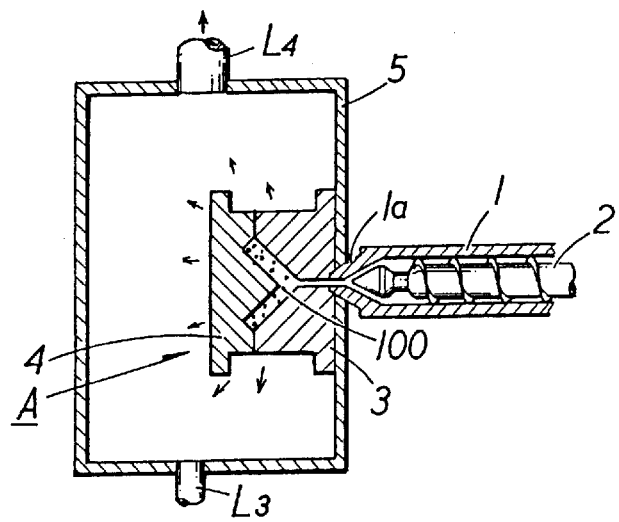
F I G. 10(c)
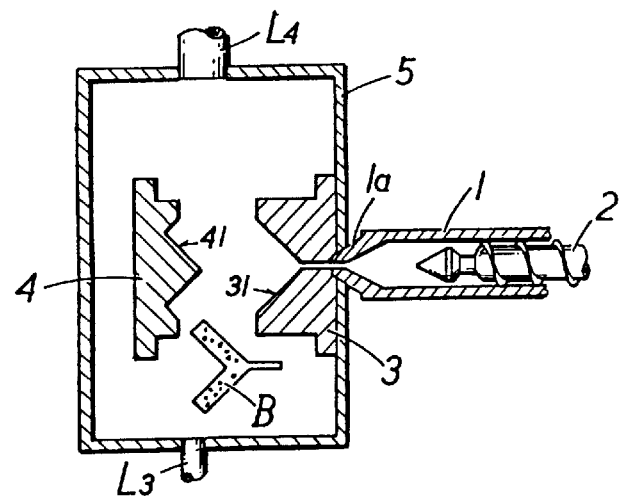

F I G. 11
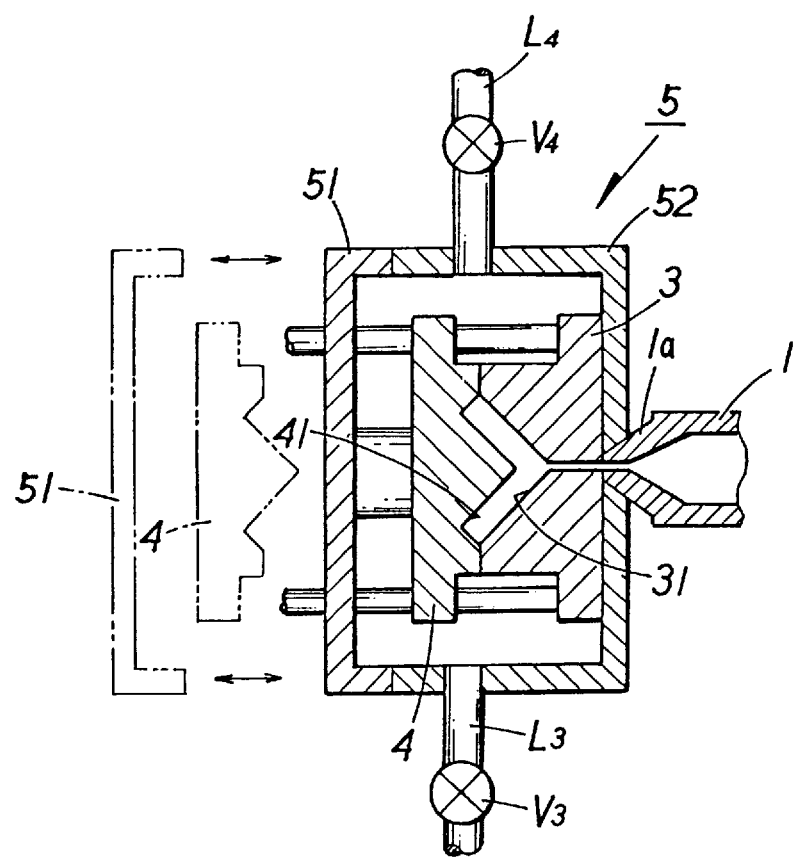

F I G. 13(a)
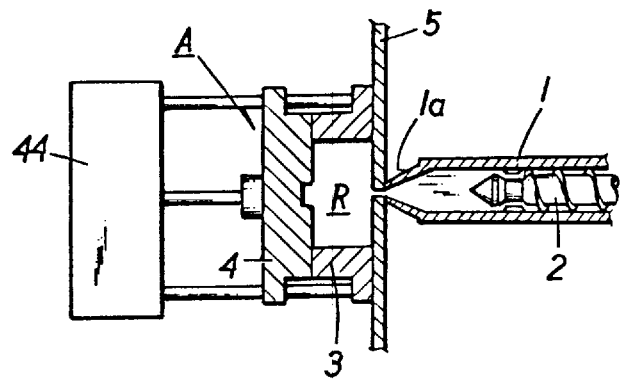
F I G. 13(b)
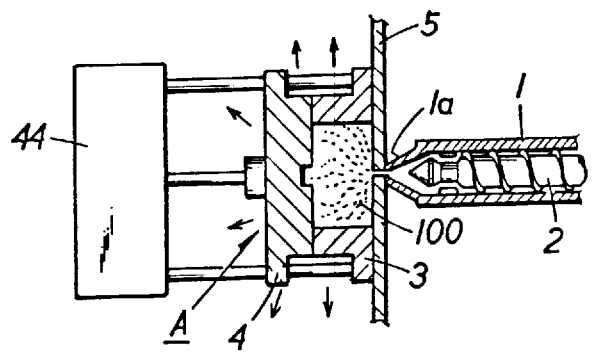
F I G. 13(c)
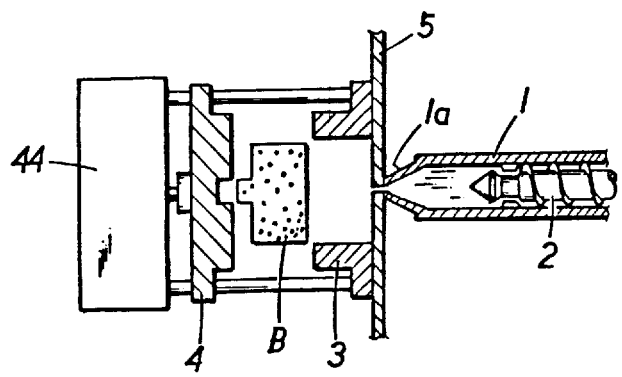

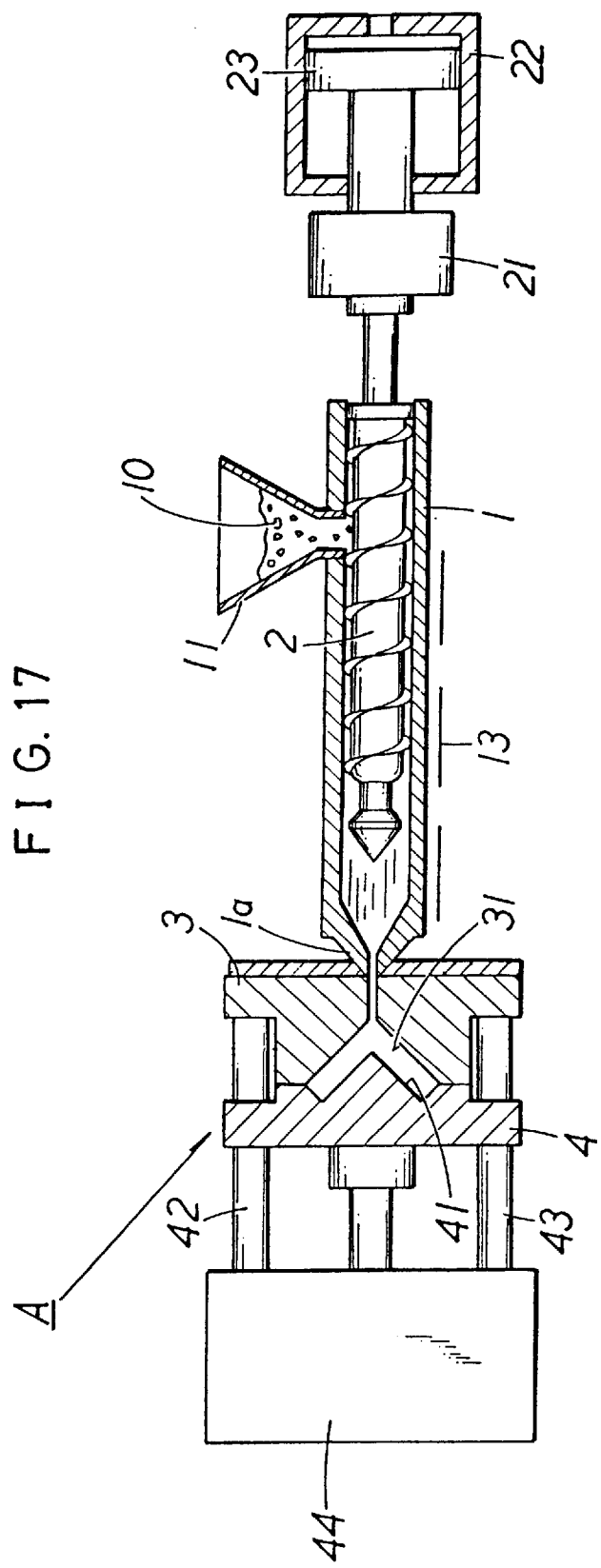

APPARATUS FOR PRODUCING BIODEGRADABLE RESIN FOAM

This is a divisional application of Ser. No. 08/274,038 filed Jul. 12, 1994 now U.S. Pat. No. 5,602,188.

BACKGROUND OF THE INVENTION

This invention relates to biodegradable resin which has been recently spotlighted in place of synthetic resin, and more particularly to a biodegradable resin foam obtained by foaming the biodegradable resin and a method and an apparatus for producing the same.

In general, synthetic resin has been applied to a variety of industrial fields because of exhibiting satisfactory mass productivity, moldability and durability. In particularly, a synthetic resin foam is light-weight and exhibits increased cushioning properties, to thereby be widely used in various forms such as a protective casing for a fragile article such as a glass product, a cushioning material for packing, a tableware, a heat insulation material, a sound insulation material and the like. However, this causes the amount of disposal of such synthetic resin products to be extensively increased, leading to various serious problems.

More particularly, incineration of synthetic resin causes a large amount of harmful gas to be produced, leading to atmospheric pollution. Disposal of synthetic resin other than the incineration causes environmental pollution because it has resistance to oxidation and resistance to decomposition by light and ozone. Also, synthetic resin is extensively increased in intermolecular bond, so that the incineration causes generation of much heat, leading to damage to an incineration furnace and therefore a decrease in lifetime of the furnace.

In view of the foregoing, much attention has been recently directed to biodegradable resin and a great effort has been made to develop biodegradable resin.

As a result, processing of biodegradable resin into a film material is now in the course of being put into practice. Also, development of foaming of biodegradable resin would lead to spread of applications thereof, to thereby permit advantages of biodegradable resin to be more widely exhibited. Techniques of foaming synthetic resin which have been carried out in the art include a method of producing foamed beads including the steps of charging styrene beads in a forming mold and adding water vapor thereto, followed by a decrease in pressure, a method of foaming synthetic resin by charging an extruder with, for example, styrene resin together with a foaming agent such as an organic solvent or the like to foam the resin due to a pressure reducing action occurring when the resin is extruded, and the like.

However, such conventional chemical foaming techniques for foaming synthetic resin as described above fail to satisfactorily foam biodegradable resin due to a relationship between a softening point or melting point of the resin and a foaming temperature of a foaming agent and the like. Thus, there are known many problems which are encountered with techniques of foaming biodegradable resin to a high degree and forming the foamed resin.

A first problem occurs when a biodegradable resin foam is to be produced by means of, for example, an injection molding machine used for production of a conventional synthetic resin foam. More particularly, when biodegradable resin fluidized due to heating and pressurization in a cylinder is extruded through a nozzle of the cylinder into a forming mold, to thereby be decreased in pressure, moisture in the resin is vaporized, leading to expansion. The moisture vaporized is then decreased in temperature, resulting in suspending in the form of steam in the mold or being condensed on an inner surface of the mold or an outer surface of a molded product. Biodegradable resin generally exhibits increased hygroscopicity, resulting in being readily softened and swollen when it is contacted wit moisture. In particular, a film of each of foamed cells on an outer portion of a molded or formed product is excessively decreased in thickness, so that it is readily softened when it absorbs condensed water. This results in the foamed cells being readily collapsed. Such collapse of the cells is also caused due to re-adhesion of moisture evaporated from the resin to the cells. The collapse causes portions of the formed product at which the cells are collapsed to be shrunk, leading to deformation of the formed product. When the formed product thus deformed is solidified, it is caused to be in a solid form substantially free of any foamed cell. Thus, the formed product thus obtained by injection molding fails to exhibit desired cushioning performance.

A second problem is that the conventional chemical foaming techniques fail to provide a foamed product having a desired configuration and exhibiting a satisfactory cushioning function. More particularly, foaming of biodegradable resin is started upon release from a pressurized state, however, it is highly hard to reach the depths of a forming mold because of exhibiting increased viscosity when it is fluidized by heating. Therefore, foaming of biodegradable resin partially occurs before the resin extruded from the cylinder reaches the depths of the forming mold, resulting in a part of the resin which is to be foamed in the depths of the mold carrying out foaming in the middle of the mold, so that any cavity and/or void are formed in the foamed resin. Such a problem tends to occur in a forming mold of a complicated configuration, Thus, the so-formed biodegradable resin foam is pressedly forced by biodegradable resin subsequently extruded, so that the portion of the resin which carried out foaming on the way to the depths of the mold is crushed by the subsequently extruded resin. Thus, the prior art fails to form the foamed resin into a desired configuration. Also, the foamed resin fails to exhibit a satisfactory cushioning performance.

A third problem occurs due to releasing of biodegradable resin fluidized by heating and pressurizing from a heated and pressurized environment. Releasing of the resin fluidized causes moisture contained in the resin to be vaporized and expanded, resulting in foaming of the resin, to thereby provide cells, during which the cells are decreased in temperature to a level of about 100° C. due to vaporization of the moisture. This causes the cells to be somewhat shrunk and then solidified while being kept shrunk. Also, the cells are somewhat shrunk by water vapor surrounding the cells. Such cells are integrated together to form a foam. Thus, cavities and/or voids occur in the foam solidified, so that boundaries between the cells are discontinuous, to thereby cause the foam to be unsuitable for use for a cushioning material.

A fourth problem encountered with the conventional chemical foaming techniques is caused during formation of an pressure reduced atmosphere. More particularly, when a heated and pressurized atmosphere in which biodegradable resin is placed is to be changed into a pressure reduced atmosphere, an evacuation or vacuum pump is generally used. Unfortunately, formation of such a pressure reduced atmosphere requires a considerable period of time, so that a pressure reducing action due to the change is rendered slow or inactive. Also, this causes moisture to re-adhere to cells while it is not fully exhausted, leading to softening of the cells, followed by collapse of the cells, resulting in the resultant resin foam being deteriorated in properties or quality. In order to prevent such re-adhesion of moisture to the cells, it would be considered that formation of the pressure reduced atmosphere is carried out using a large-sized vacuum pump or the like, resulting in time required for evacuation being reduced. However, this causes a significant increase in manufacturing cost of the foam.

Further, injection of biodegradable resin from a nozzle of a cylinder of an injection molding machine into a forming mold arranged in a closed atmosphere causes injection resistance to be increased. In order to avoid the problem, it is required to arrange a large-sized injection molding machine. Unfortunately, this leads to an increase in cost of equipment and therefore manufacturing cost. In particular, in order to form a foam with high configuration accuracy, it is required to permit biodegradable resin to be spread throughout the forming mold. This is advantageously-accomplished by keeping an atmosphere in the forming mold pressurized during injection molding. However, this causes injection resistance to be further increased, resulting in the above-described disadvantage being rendered amplified.

SUMMARY OF THE INVENTION

The present invention has been made in view of the foregoing disadvantages of the prior art.

Accordingly, it is an object of the present invention to provide a method for producing a biodegradable resin foam which is capable of accomplishing foaming of biodegradable resin while minimizing or substantially preventing shrinkage of formed biodegradable resin due to re-adhesion of moisture thereto, to thereby provide a uniform biodegradable resin foam.

It is another object of the present invention to provide a method for producing a biodegradable resin foam which is capable of uniformly foaming biodegradable resin.

It is a further object of the present invention to provide a method for producing a biodegradable resin foam which is capable of minimizing or substantially preventing collapse of cells of foamed biodegradable resin to provide a biodegradable resin foam of a desired configuration and uniform quality.

It is still another object of the present invention to provide a method for producing a biodegradable resin foam which is capable of providing a water-repellent biodegradable resin foam.

It is yet another object of the present invention to provide a method for producing a biodegradable resin foam which is capable of providing a biodegradable resin foam free of any discontinuous boundary between cells even when any cavity and/or void occurs in biodegradable resin foamed.

It is even another object of the present invention to provide a biodegradable resin foam which is substantially free of any discontinuous boundary between cells even when any cavity and/or void occurs in biodegradable resin foamed.

It is a still further object of the present invention to provide an apparatus for producing a biodegradable resin foam which is capable of preventing an increase in cost of equipment and accomplishing rapid pressure reduction and evacuation of an atmosphere in a forming mold at an appropriate timing, to thereby provide a biodegradable resin foam of improved quality.

It is a yet further object of the present invention to provide an apparatus for producing a biodegradable resin foam which is capable of preventing an increase in cost of equipment and facilitating injection of biodegradable resin into a forming mold while keeping injection resistance at a minimum level, to thereby increase configuration accuracy of a biodegradable resin foam.

In accordance with one aspect of the present invention, a biodegradable resin foam is provided which is made of biodegradable resin by expansion force due to vaporization of moisture caused by rapidly releasing fluidized biodegradable resin which is in a heated and pressurized environment and in which the moisture is trapped. The biodegradable resin may comprise a combination of a first biodegradable resin ingredient having a melting point of 100° C. or more or a main biodegradable resin ingredient and a second biodegradable resin ingredient having a melting point of 100° C. or less or a low-melting biodegradable resin ingredient.

In a preferred embodiment of the present invention, the second biodegradable resin ingredient may be selected from the group consisting of polycaprolactone and a material containing polycaprolactone.

In a preferred embodiment of the present invention, the biodegradable resin may have a substance selected from the group consisting of polyhydric alcohols and derivatives thereof added thereto.

Thus, in the foam of the present invention, the second biodegradable resin ingredient is kept from being immediately solidified, to thereby function as an adhesive with respect to the first biodegradable resin ingredient. Therefore, even when any cavity and/or void are unfortunately formed in the foamed biodegradable resin, cells of the foamed resin are permitted to adhere to each other through the second resin ingredient, resulting in the foam being provided with satisfactory quality.

When the second biodegradable resin ingredient is selected from the group consisting of polycaprolactone and a material containing polycaprolactone, the function of the second biodegradable resin ingredient as an adhesive is substantially enhanced. Also, when the biodegradable resin has polyhydric alcohols and derivatives thereof added thereto, moisture in the resin is increased in boiling point, resulting in functioning also as a plasticizer, so that cells of the foamed biodegradable resin are rendered dense and uniform.

In accordance with another aspect of the present invention, a method for producing a biodegradable resin foam is provided. The method comprises the steps of charging a biodegradable resin starting material containing biodegradable resin in a cylinder formed at a front portion thereof with a narrowed opening, raising a temperature of the biodegradable resin to render the biodegradable resin fluidized while forcibly transferring the biodegradable resin starting material toward the narrowed opening in the cylinder, extruding the fluidized biodegradable resin from the cylinder into an air-permeable forming mold arranged in front of the cylinder to rapidly release the biodegradable resin from a heated and pressurized environment in the cylinder to foam the biodegradable resin, and forming the foamed biodegradable resin into a shape depending on a configuration of the forming mold. Thus, moisture contained in the resin is increased in boiling point under pressure, resulting in being in the form of liquid in the cylinder, so that releasing of the resin from the heated and pressurized environment in the cylinder causes the moisture to be instantaneously vaporized, leading to foaming of the resin. The resultant water vapor is outwardly discharged through the air-permeable forming mold, to thereby be prevented from re-adhering to the formed foam.

In a preferred embodiment of the present invention, an atmosphere in which the forming mold is placed is kept decreased in pressure or ventilated since a stage before starting of extrusion of the fluidized biodegradable resin into the forming mold or since starting of the extrusion. Such construction prevents moisture from remaining in the form of steam in the forming mold or being condensed on a surface of the resin foam due to a decrease in temperature after vaporization and expansion of the moisture, resulting in the form being provided with satisfactory uniformity.

In a preferred embodiment of the present invention, the step of extruding the fluidized biodegradable resin into the mold is carried out while placing a nozzle arranged with respect to the narrowed opening in the depths of the forming mold at the time of starting of the nozzle and retracting the nozzle relative to the forming mold during extrusion of the biodegradable resin. This permits the biodegradable resin to be charged in the forming mold in order from the side of the depths of the mold, resulting in a difference between a timing at which the resin is spread throughout the forming mold and a timing of foaming of the resin being minimized or substantially eliminated, to thereby substantially prevent cells of the foamed biodegradable resin from being collapsed.

In a preferred embodiment of the present invention, the step of extruding the fluidized biodegradable resin into the forming mold is carried out while keeping an atmosphere in the forming mold pressurized during the extrusion and rapidly reducing a pressure of the atmosphere in the forming mold after completion of the extrusion. This permits the biodegradable resin to be foamed while being spread throughout the forming mold, so that the resin foam obtained is formed into a desired configuration.

In a preferred embodiment of the present invention, the step of extruding the fluidized biodegradable resin into the forming mold is carried out by injecting the biodegradable resin into the forming mold while keeping the resin atomized. This permits not only the resin to be spread throughout the forming mold but the atomized resin to be effectively foamed, followed by integration of cells of the foamed resin without being collapsed, to thereby provide the resin foam with increased uniformity.

In a preferred embodiment of the present invention, the biodegradable resin starting material may comprise moisture and the biodegradable resin. Alternatively, it may comprise the biodegradable resin and a hygroscopic fine-particle material having moisture absorbed therein and added to the biodegradable resin. Also, the biodegradable resin starting material may comprise moisture, the biodegradable resin and a water repellent material. The starting material of such composition ensures desired foaming of the resin and permits it to be finely and uniformly foamed.

Also, the water repellent material may comprise a material which is not fully evaporated when the resin fluidized is released from the heated and pressurized environment. The material may include a natural fatty acid polymer. Use of the polymer as the water repellent material permits it to cover cells of the foamed resin to provide it with water repellent properties, to thereby prevent the cells from being collapsed due to contact with water.

In a preferred embodiment of the present invention, the step of forming the foamed biodegradable resin into a shape depending on a configuration of the forming mold may be carried out by forming the whole biodegradable resin into an integrated configuration. This permits the resin foam to be formed into a relative large volume or any desired configuration.

In a preferred embodiment of the present invention, the biodegradable resin comprises a first biodegradable resin ingredient having a melting point of 100° C. or more and a second biodegradable resin ingredient having a melting point of 100° C. or less.

In a preferred embodiment of the present invention, the second biodegradable resin ingredient is selected from the group consisting of polycaprolactone and a material containing it.

In a preferred embodiment of the present invention, the biodegradable resin has a substance selected from the group consisting of polyhydric alcohols and derivatives thereof added thereto.

In accordance-with a further aspect of the present invention, an apparatus for producing a biodegradable resin foam is provided. The apparatus comprises a pressure adjusting chamber constructed in a manner to be capable of being opened and closed hermetically, an air-permeable forming mold arranged in the pressure adjusting chamber, a pressure reducing tank connected to the pressure adjusting chamber to rapidly reduce a pressure in the pressure adjusting chamber, and an injection machine for injecting, into the forming mold, fluidized biodegradable resin placed in a heated and pressurized environment and having moisture trapped therein. Thus, the apparatus permits the pressure reducing tank to communicate with the pressure adjusting chamber after injection of the resin into the forming mold, so that water vapor produced in the forming mold may be effectively outwardly discharged, to thereby eliminate retention of moisture in the forming mold. Thus, the biodegradable resin foam product obtained is provided with a desired configuration and uniform quality.

In a preferred embodiment of the present invention, the pressure adjusting chamber has an evacuation valve connected thereto. Thus, when the pressure adjusting chamber is rendered open to an ambient atmosphere in the course of injection of the rein into the forming mold, resistance to the injection is reduced because the forming mold is air-permeable, so that the injection may be facilitated. Therefore, the injection machine is prevented from being large-sized.

In a preferred embodiment of the present invention, the pressure adjusting chamber has a compressor connected thereto. This permits injection of the resin into the forming mold to be carried out while keeping moisture positively trapped in the resin because actuation of the compressor pressurizes the pressure adjusting chamber. Then, operation of the evacuation valve results in the pressure adjusting chamber being released from pressurization, leading to a decrease in injection resistance, so that the resin may be spread throughout the forming mold.

In a preferred embodiment of the present invention, the pressure adjusting chamber has a pressurizing tank connected thereto. This permits the pressure adjusting chamber to be rapidly pressurized at an appropriate timing when the resin is to be injected into the forming mold.

Also, in accordance with this aspect of the present invention, an apparatus for producing a biodegradable resin foam is provided. The apparatus comprises a pressure adjusting chamber constructed in a manner to be capable of being opened and closed hermetically, an airpermeable forming mold arranged in the pressure adjusting chamber, a pressure reducing tank connected through a pressure reducing valve to the pressure adjusting chamber to rapidly reduce a pressure in the pressure adjusting chamber, an evacuation valve connected to the pressure adjusting chamber, a compressor connected to the pressure adjusting chamber, a valve controller for controlling operation of each of the valves, and an injection machine for injecting, into the forming mold, fluidized biodegradable resin placed in a heated and pressurized environment and having moisture trapped therein. The valve controller functions to initiate actuation of the compressor before or at the time when injection of the biodegradable resin into the forming mold by the injection machine is started, carry out termination of actuation of the compressor and opening of the evacuation valve in the course of the injection, and carry out closing of the evacuation valve and opening of the pressure reducing valve after the injection. Thus, the pressure adjusting chamber may be controlled to pressurization, evacuation or pressure reduction in association with a timing of injection of the resin into the forming mold.

Further, in accordance with this aspect of the present invention, an apparatus for producing a biodegradable resin foam is provided. The apparatus comprises a pressure adjusting chamber constructed in a manner to be capable of being opened and closed hermetically, an airpermeable forming mold arranged in the pressure adjusting chamber, a pressure reducing tank connected through a pressure reducing valve to the pressure adjusting chamber to rapidly reduce a pressure in the pressure adjusting chamber, an evacuation valve connected to the pressure adjusting chamber, a pressurizing tank connected through a pressurizing valve to the pressure adjusting chamber, a valve controller for controlling operation of each of the valves, and an injection machine for injecting, into the forming mold, fluidized biodegradable resin placed in a heated and pressurized environment and having moisture trapped therein. The valve controller functions to open the pressurizing valve before or at the time when injection of the biodegradable resin into the forming mold by the injection machine is started, carry out closing of the pressurizing valve and opening of the evacuation valve in the course of the injection, and carry out closing of the evacuation valve and opening of the pressure reducing valve after the injection. Thus, the pressure adjusting chamber is controlled to pressurization, evacuation or pressure reduction in association with a timing of the injection.

In addition, in accordance with this aspect of the present invention, an apparatus for producing a biodegradable resin foam is provided. The apparatus comprises a pressure adjusting chamber constructed in a manner to be capable of being opened and closed hermetically, an air-permeable forming mold arranged in the pressure adjusting chamber, a pressure reducing tank connected through a pressure reducing valve to the pressure adjusting chamber to rapidly reduce a pressure in the pressure adjusting chamber, an evacuation valve connected to the pressure adjusting chamber, a valve controller for controlling operation of each of the valves, and an injection machine for injecting, into the forming mold, fluidized biodegradable resin placed in a heated and pressurized environment and having moisture trapped therein. The valve controller functions to open the evacuation valve in the course of injection of the biodegradable resin into the forming mold by the injection machine and carry out closing of the evacuation valve and opening of the pressure reducing valve after the injection. Thus, the pressure adjusting chamber is controlled to evacuation or pressure reduction in association with a timing of the injection.

Furthermore, in accordance with this aspect of the present invention, an apparatus for producing a biodegradable resin foam is provided. The apparatus comprises a pressure adjusting chamber constructed in a manner to be capable of being opened and closed hermetically, an air-permeable forming mold arranged in the pressure adjusting chamber, a pressure reducing tank connected through a pressure reducing valve to the pressure adjusting chamber to rapidly reduce a pressure in the pressure adjusting chamber, a pressurizing tank connected through a pressurizing valve to the pressure adjusting chamber, a valve controller for controlling operation of each of said valves, and an injection machine for injecting, into the forming mold, fluidized biodegradable resin placed in a heated and pressurized environment and having moisture trapped therein. The valve controller functions to open the pressurizing valve before or at the time when injection of the biodegradable resin into the forming mold by the injection machine is started and carry out closing of the pressurizing valve and opening of the evacuation valve after the injection. This permits the pressure adjusting chamber to be controlled to pressurization or pressure reduction in association with a timing of the injection.

In a preferred embodiment of the present invention, the injection machine includes a cylinder having a narrowed opening formed at a front portion thereof, a forcible transfer mechanism for forcibly transferring a biodegradable resin starting material containing biodegradable resin and charged in the cylinder and raising a temperature of the biodegradable resin, to thereby fluidize it and extruding the fluidized biodegradable resin through the narrowed opening into a forming mold, and an access mechanism for reciprocating the narrowed opening and forming mold relative to each other and retracting the narrowed opening relative to the forming mold during injection of the fluidized biodegradable resin through the narrowed opening into the forming mold.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 9 is a vertical sectional side elevation view generally showing an example of an apparatus suitable for use for practicing a further embodiment of a method for producing a biodegradable resin foam according to the present invention;

FIGS. 10(a) to 10(c) each are a schematic sectional view showing each of steps of the method of FIG. 9;

FIG. 11 is a vertical sectional side elevation view showing an essential part of a further example of the apparatus suitable for use for practicing the method shown in FIG. 9;

FIGS. 13(a) to 13(c) each are a schematic sectional view showing each of steps of the method of FIG. 12;

FIG. 17 is a vertical sectional side elevation view generally showing an example of an apparatus suitable for use for practicing yet another embodiment of a method for producing a biodegradable resin foam according to the present invention;

DETAILED DESCRIPTION OF THE PREFERRED EMBODIMENTS

Now, the present invention will be described hereinafter with reference to the accompanying drawings.

The following description of the present invention will be made first on a biodegradable resin foam according to the present invention and then on a method for producing a biodegradable resin foam together with an apparatus therefor. Then, an apparatus for producing a biodegradable resin foam featured in a mechanism for adjusting a pressure in a forming mold and a method for producing a biodegradable resin foam practiced using the apparatus will be described. Further, an apparatus and a method for producing a biodegradable resin foam each of which is constructed so as to permit a volume in a forming space to be varied as desired will be described.

Figure 2A:
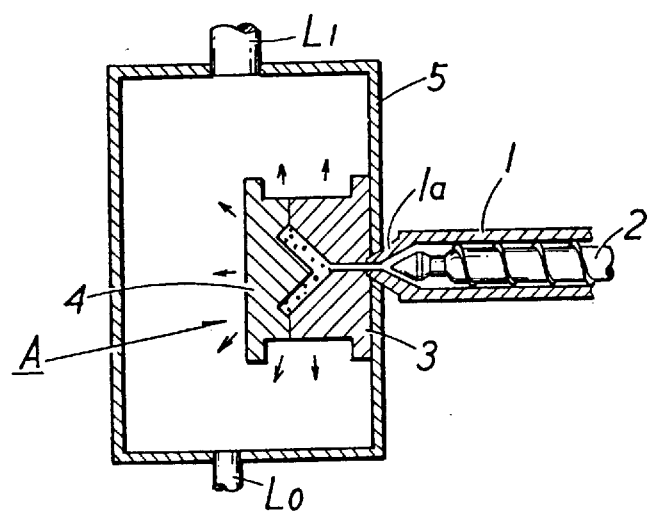
FIGS. 2(a) to 2(c) each are a schematic sectional view showing each of steps of the method of FIG. 1.
Figure 2B:
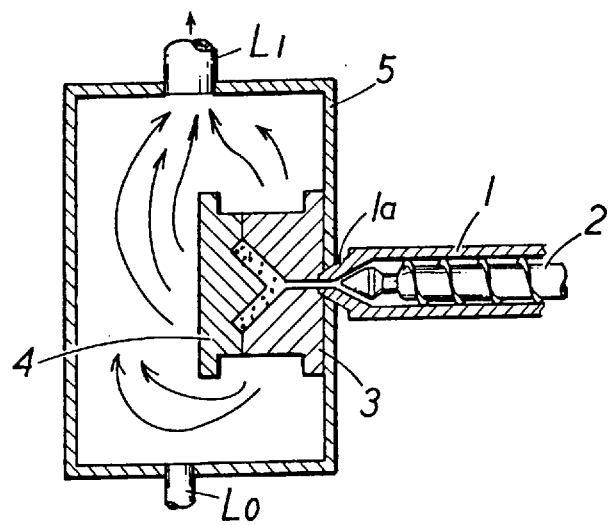
Figure 2C:
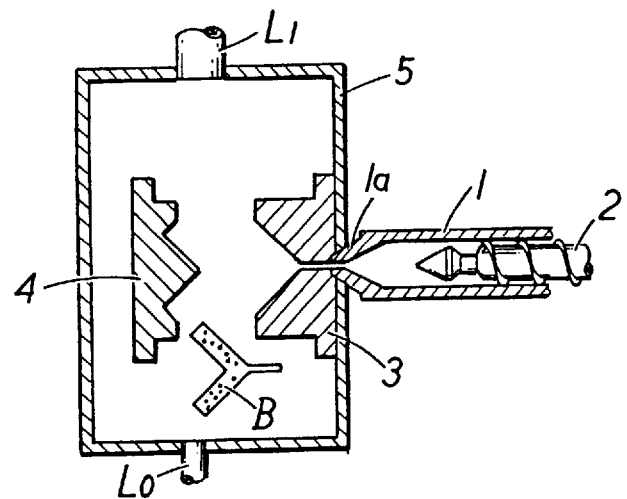
Figure 3:
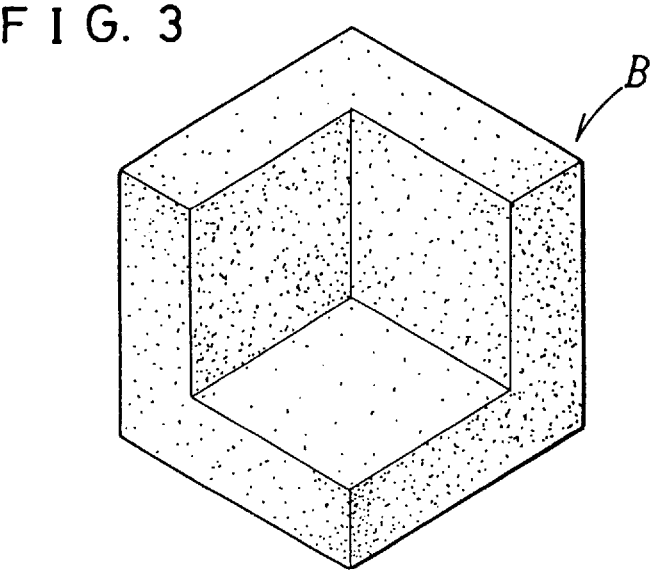
FIG. 3 is a perspective view showing an embodiment of a biodegradable resin foam according to the present invention.

The present invention is directed to a biodegradable resin foam, which is generally designated at reference character B in FIGS. 2 and 3. The biodegradable resin foam B is produced by foaming biodegradable resin by means of expansion force due to vaporization of moisture. The biodegradable resin consists of a first biodegradable resin ingredient of 100° C. or more in melting point (hereinafter also referred to as "main biodegradable resin ingredient") and a second biodegradable resin ingredient of 100° C. or less in melting point (hereinafter also referred to as "low-melting biodegradable resin ingredient").

The term "biodegradable resin" used herein indicates a resin material which is decreased in physical properties due to a biological action and such biodegradable resin includes resin of the type that it per se is fully decomposed and resin of the type that it is blended with resin hard to be decomposed, resulting in it being provided with degradative properties. The resin of the former type includes products by microbes, products of natural high-molecular substances, products of petroleum materials and the like and that of the latter type includes blends with starch, blends with aliphatic polyesters and the like. Biodegradation of the biodegradable resin includes biodegradation by an enzyme such as lipase, amylase, cellulase, protease or the like, that by microbes in active sludge or the like, that by soil in a natural environment such as forest or cultivated land, and the like.

More particularly, the biodegradable resin includes polyhydroxy butyric acid and derivatives thereof, pullulan, a cellulose-chitosan mixture, an ester compound of cellulose, amylose or wood meal, a polyester-nylon copolymer, and a blend of starch and polyethylene, as well as polyvinyl alcohol, polyether, polyurethane, polyamide and the like. Such materials substantially have a low-melting point and are readily decomposed in the presence of water.

The first biodegradable resin ingredient of 100° C. or more or main biodegradable resin ingredient which is commercially available includes resin sold under "Mater-Bi" (registered trademark) from Nippon, Gosei Kagaku Kabushiki Kaisha, Japan. The resin was developed by Novamont belonging to a Montedison group, Italy and is said to be a thermoplastic biodegradable polymer comprising derivatives from a plurality of agricultural products such as starch and the like and denatured polyvinyl alcohol wherein the derivatives and alcohol get into each other at a molecular level, to thereby bonded to each other by hydrogen bonding. Also, it is said that the biodegradable resin is swollen due to absorption of moisture, resulting in biodegradation thereof being promoted, to thereby exhibit substantially the same biodegradability as paper in an environment in which microbes exist. In addition to "Mater-Bi" described above, for example, acetate which is an ester compound of cellulose may be of course used as the first biodegradable resin ingredient having a melting point of 100° C. or more. In this instance, the biodegradable resin may comprise only the first biodegradable resin ingredient of 100° C. or less in melting point or main biodegradable resin ingredient, to thereby eliminate addition of the second biodegradable ingredient of 100° C. or less in melting point or low-melting biodegradable resin ingredient described hereinafter thereto.

The low-melting biodegradable resin ingredient, even when any cavity or void occurs in the biodegradable resin during formation of the biodegradable resin into a foam, functions to permit walls of cells of the foam to adhere to each other as much as possible. In the present invention, for example, polycaprolactone or a material containing polycaprolactone may be preferably used for the low-melting biodegradable resin ingredient. Such a low-melting biodegradable resin ingredient which may be commercially available includes resin sold under a tradename "Tone" from Nippon Unicar Kabushiki Kaisha, Japan. The commercially available resin "Tone" comprises polycprolactone which is aliphatic polyester chemically synthesized and is of the full decomposition type.

Also, in the present invention, the biodegradable resin may have polyhydric alcohols and/or derivatives thereof added thereto as desired. In particular, glycols are preferably added to the resin. Addition of polyhydric alcohols or the derivatives permits moisture in the biodegradable resin to be increased in boiling point, so that the moisture functions also as a plasticizer. Also, the polyhydric alcohols and the derivatives per se each also act as a plasticizer, so that the cells of the foamed biodegradable resin may be rendered compact and uniform. The polyhydric alcohols and derivatives include glycerin, polyethylene glycol and the like, and derivatives thereof.

A means for permitting moisture to be contained or present in the biodegradable resin is not limited to any specific means. For example, a suitable amount of moisture may be previously contained in the resin when pellets of the biodegradable resin for foaming are formed. Alternatively, a pretreatment step is provided for permitting a suitable amount of moisture to be positively contained in particles of the resin. Alternatively, moisture may be charged in a hopper together with biodegradable resin directly or through a kneader. Thus, it will be noted that feeding of the biodegradable resin and moisture is not limited to any specific manner. Also, addition of a fine particle-like hygroscopic material having moisture previously absorbed therein such as, for example, talc or silica to the biodegradable resin as in the pellets for foaming permits a foam having cells formed finely and uniformly to be provided, because moisture in the fine particles exhibits good compatibility and dispersion with respect to the biodegradable resin as compared with moisture directly added thereto and moisture in the fine particles contributes to foaming of the resin while originating from the fine particles.

The biodegradable resin foam B of the present invention is produced by foaming the biodegradable resin kept fluidized by heating and pressuring by means of expansion force due to vaporization of moisture contained therein. At this time, the resultant foamed resin is reduced in temperature to a level of about 100° C. by vaporization of the moisture. This causes the main biodegradable resin ingredient or first biodegradable resin ingredient to be solidified because a melting point thereof is 100° C. or more, whereas the low-melting biodegradable resin ingredient or second biodegradable resin ingredient is kept from being solidified because its melting point is 100° C. or less; so that the latter ingredient acts as an adhesive with respect to the former ingredient. Thus, even when any cavity and/or void occur in the foamed resin during the formation, walls between cells of the foamed resin are substantially adhered to each other, so that the biodegradable resin foam B may be provided with satisfactory quality.

When the biodegradable resin starting material for the biodegradable resin foam B of the present invention comprises moisture, the biodegradable resin and a water repellent material, the water repellent material and moisture may be previously contained in or added to the biodegradable resin, followed by charging the starting material into an injection molding machine, because the biodegradable resin is placed under a heating and pressurizing condition in the presence of the water repellent material and substantial moisture. The water repellent material, may include silicone compounds, fluorine compounds, waxes, polymers of a higher fatty acid and the like. In the illustrated embodiment, a commercially available material which is manufactured by Kabushiki Kaisha Sigma Gijutu Kenkyujo and sold from Tonen Kabushiki Kaisha under a tradename "Sigma coat" and mainly consists of polymers of a higher aliphatic acid and waxes may be used as the water repellent material. Addition of the water repellent material to the biodegradable resin may be carried out, for example, by diluting the water repellent material ("Sigma Coat") with water and then heating it to form an emulsion, followed by addition of the emulsion thereto. This permits the water repellent material and moisture to be concurrently added to the biodegradable resin. Alternatively, addition of the water repellent material to the biodegradable material and that of moisture thereto may be carried out separately from each other. For this purpose, the water repellent material may be added to the biodegradable resin containing moisture. The biodegradable resin foam B of the present invention thus formed is not limited to an application to a cushioning material. It may be directed to various applications such as a heat insulating material, a sound insulating material and the like as in a conventional foamed styrol material.

Now, a method for producing a biodegradable resin foam according to the present invention will be described hereinafter together with an apparatus suitable for use for practicing the method. First, the apparatus will be described with reference to FIG. 1.

The apparatus includes a cylinder 1 formed into a shape like a cylindrical container, which is provided on an upper portion of a rear end section thereof with a hopper 11 for charging a biodegradable resin starting material for a resin foam therethrough into the cylinder 1. The cylinder 1 is formed at a distal end thereof with a narrowed opening 1a and provided on around a periphery thereof with a heater 13.

The cylinder 1 is provided therein with a screw 2 in a manner to extend in a longitudinal direction thereof and be in proximity to an inner surface thereof. The screw 2 is so arranged that a rear end thereof is outwardly projected through an opening formed at a rear end of the cylinder 1 and connected to a front portion of a hydraulic motor 21 for rotating the screw 2. The hydraulic motor 21 is mounted on a rear portion thereof with a piston 23, which is slidably received in an injection cylinder 22, so that the piston 23, hydraulic motor 21 and screw 2 are hydraulically moved integrally with each other in the longitudinal direction of the cylinder 1 and the screw 2 is rotated by the hydraulic motor 21.

Thus, an injection machine S which is a so-called in-line screw type injection molding machine is constructed. The injection apparatus S is provided at a distal end section thereof with an air-permeable forming mold A, which includes a fixed mold part 3 formed with a cavity 31 communicating with the narrowed opening 1a of the cylinder 1 and a movable mold part 4 formed with a core 41. In the illustrated embodiment, the cavity 31 is formed into a configuration like a substantially triangular pyramid and the core 41 is formed into a triangular pyramid-like shape corresponding to the cavity 31 but smaller by a thickness of a formed product or resin foam B (FIG. 3) than the cavity 31. The fixed and movable mold parts 3 and 4 thus constructed are clamped together, to thereby define a space of a trihedral structure of which three surfaces are perpendicular to each other, resulting in providing such a formed product or biodegradable resin foam product shown in FIG. 3.

Reference numeral 40 designates a mold clamp mechanism arranged in combination with the forming mold A, which mechanism includes tie bars 42 and 43, and an actuator mechanism 44 for accessibly operating the tie bars 42 and 43 and movable mold part 4 so as to access the movable mold part 4 to the fixed mold part 3 while keeping both parts opposite to each other.

The forming mold A is made of a porous material having a number of pores or holes formed therein while being arranged in a net-like manner so as to communicate an interior of the mold A with an exterior thereof. Such a porous material includes a foamed metal material, a sintered material made by sintering metal, ceramic or the like to which a filler capable of forming the material with voids is added, a material made by subjecting a wire mesh, a punched metal plate or the like to pressing and laminating, and the like. The forming mold A may be readily made, for example, by forming a single punched metal plate into a predetermined configuration. In this case, an increase in size of pores of the porous material leads to an increase in efficiency of exhaust of water vapor and efficiency of ventilation, however, an excessive increase in size of the pores causes roughness due to the pores to appear on a surface of the foamed resin after foaming of the resin. Thus, the pores of the porous material should be set to a size which permits a surface of the resin foam to be provided with smoothness suitable for applications to which the foam is directed while preventing resistance to permeation of air through the mold A from being excessively increased. In view of the above, a punched metal plate is suitable for use as the porous material for the forming mold A because it permits a diameter of the pores, the number thereof and a pitch thereof and the like to be readily set and is simplified in structure.

The forming mold A and mold clamp mechanism 40 are arranged in a chamber 5 of an airtight structure acting as a pressure adjusting chamber. The chamber 5 includes a wall joined to a rear surface of the fixed mold part 3 of the mold A and is provided with a door (not shown) through which the resin foam made of biodegradable resin is removed. The chamber 5 has a pressure reducing pipe $L_1$ connected thereto, which is provided with a pressure reducing valve $V_1$ and connected to a pressure reducing pump $P_1$ through the valve $V_1$. Also, the chamber 5 has an atmospheric pressure releasing pipe $L_0$ connected thereto, which is provided with an atmospheric pressure releasing valve $V_0$ for releasing pressure in the chamber from a reduced pressure state to an atmospheric pressure.

Now, a method for producing a biodegradable resin foam according to the present invention practiced using the apparatus constructed as described above will be described hereinafter.

Figure 1:
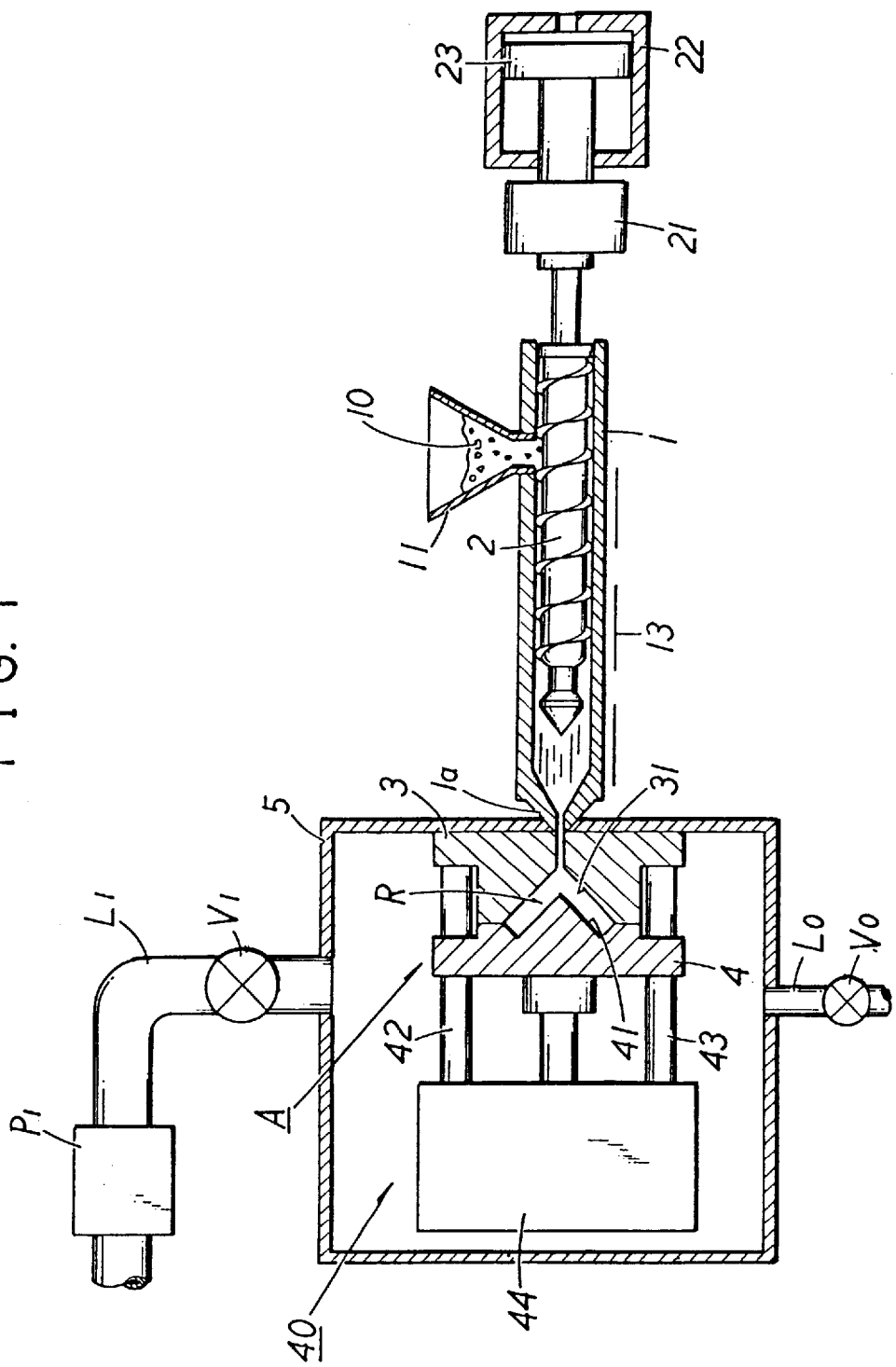
FIG. 1 is a vertical sectional side elevation view generally showing an example of an apparatus suitable for use for practicing an embodiment of a method for producing a biodegradable resin foam according to the present invention.

First, the forming mold A is clamped through the mold clamp mechanism 40 and the pressure reducing valve $V_1$ is closed to keep the chamber 5 at an atmospheric pressure. Then, as shown in FIG. 1, the hopper 11 is fed with biodegradable resin particles 10 in which moisture is contained, which are then forcedly forwardly transferred in the cylinder 1 by means of the screw 2. The biodegradable resin particles 10 are increased in temperature to a level of a softening point of the resin or melting point thereof by shearing force due to rotation of the screw 2 and heating applied thereto from the heater 13, resulting in being fluidized in an inner space of the cylinder 1 defined on a distal end side of the screw 2.

At this time, the inner space of the cylinder 1 is kept heated and pressurized, so that moisture contained in the biodegradable resin particles 10 is kept trapped in the fluidized biodegradable resin without evaporating therefrom. Then, rotation of the screw 2 is stopped and then the piston 23 in the injection cylinder 22 is actuated to forwardly move the screw as shown in FIG. 2(a), resulting in the fluidized biodegradable resin being injected through the narrowed opening 1a into a forming space R defined in the forming mold A at a stretch.

This causes the biodegradable resin in the heated and pressurized state to be rapidly exposed to atmospheric pressure, so that moisture trapped therein may be instantaneously vaporized, leading to foaming of the resin. Vaporization of the moisture causes expansion forces to occur in the biodegradable resin. However, an outermost portion of the resin is contacted with an inner surface of the forming mold A, resulting in being regulated by a configuration of each of the cavity 31 and core 41, to thereby provide a biodegradable resin foam product B as shown in FIG. 3 which is wholly integrally formed.

In the foaming, the moisture is decreased in temperature after the vaporization and expansion, resulting in drifting inside and outside the forming mold A in a steam state or condensing on a surface of each of the forming mold A and foam product due to contact therewith, so that the moisture tends to form water droplets. In order to avoid formation of water droplets, the pressure reducing valve $V_1$ is open immediately after extrusion of the biodegradable resin into the forming mold A as shown in FIG. 2(b), to thereby reduce a pressure in the chamber 5 to a gauge pressure of, for example, about 750 mmHg by evacuation through the pressure reducing pump $P_1$. During the evacuation, water vapor is partially sucked in the pressure reducing pipe $L_1$ prior to formation of water droplets. Also, moisture which tends to form water droplets on the surface of each of the forming mold A and resin form product B due to condensation is likewise removed by evacuation under a reduced pressure.

Following evacuation under a reduced pressure for a predetermined period of time, the pressure reducing valve $V_1$ is closed and the atmospheric pressure releasing valve $V_0$ is open, so that air is introduced through the atmospheric pressure releasing pipe $L_0$ into the chamber 5 to return the chamber to an atmospheric pressure. Then, the screw 2 is retracted while being rotated as shown in FIG. 2(c), resulting in the next biodegradable resin fluidized starting to collect in the inner space of the cylinder 1 on the side of the distal end of the screw 2 for the next injection, during which cooling and solidification of the biodegradable resin foam product B in the forming space R of the forming mold A is completed. Thereafter, the forming mold A is rendered open to remove the formed biodegradable resin form product B therefrom, followed by being clamped for the next operation.

The forming mold A, as described above, is formed at at least a part thereof of a porous material which permits an exterior of the mold A and an interior thereof to communicate with each other, to thereby be provided with air-permeability, resulting in a pressure of gas generated in the forming mold A due to expansion of moisture being effectively escaped to the exterior of the mold A. This not only effectively prevents the gas pressure from collapsing the resultant biodegradable resin foam, but decreases a pressure in the chamber 5 due to evacuation to forcibly remove moisture contributing foaming of the resin from the chamber 5, to thereby keep the resin foam from being contacted with the moisture. Thus, cells of the resin foam are substantially prevented from being collapsed, resulting in satisfactory cells being uniformly distributed over the resultant resin foam, so that it may be effectively used as a uniform cushioning material.

Alternatively, the illustrated embodiment may be constructed in such a manner that moisture is previously absorbed in a hygroscopic fine-particle material, which is then dispersed in the biodegradable resin, to thereby provide the biodegradable resin starting material for the resin foam. In this instance, the moisture is highly uniformly dispersed in the biodegradable resin fluidized which is extruded from the injection machine S while being kept carried on the fine particles, so that the moisture permits the resin to be foamed while acting the fine particles as an origin or center of the foaming, resulting in foaming of the resin being rendered uniform.

Figure 4:
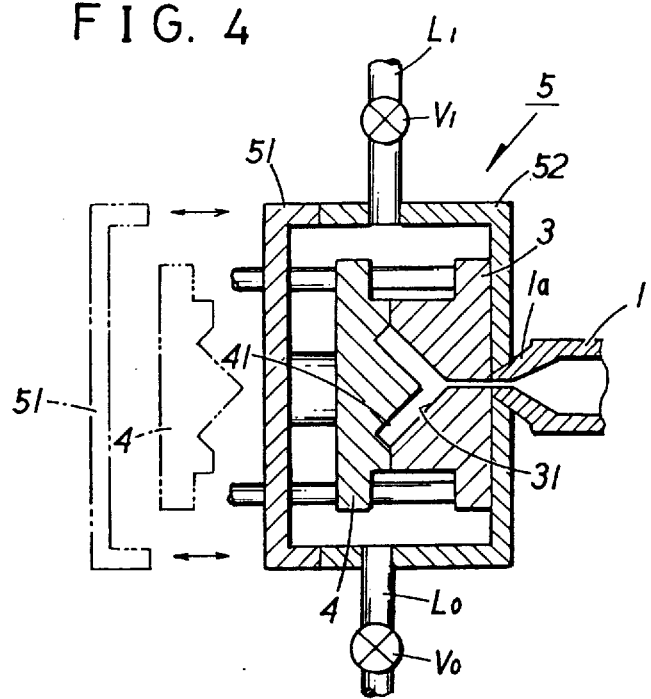
FIG. 4 is a vertical sectional side elevation view showing an essential part of another example of the apparatus suitable for use for practicing the method of FIG. 1.

The apparatus suitable for use for practicing the method of the present invention may be constructed as shown in FIG. 4. More particularly, an apparatus shown in FIG. 4 includes a chamber 5 divided into a movable-side part 51 and a fixed-side part 52, wherein the movable-side part 51 is arranged so as to be movable together with the movable mold part 4. Such construction permits the forming mold A and chamber 5 to be concurrently operated, to thereby facilitate removal of the biodegradable resin foam B from the mold A and chamber 5.

Now, an experiment made for ascertaining functions and advantages of the present invention will be described hereinafter.

Experiment

Biodegradable resin foams were produced while varying a period of time between starting of extrusion of the biodegradable resin through the narrowed opening 1a and starting of evacuation under a reduced pressure (release lapse time) and a period of time during which evacuation was carried out (pressure reduction time), followed by observation of the products.

Conditions for Experiment

An injection molding machine of Type PS60E12ASE manufactured by Nissei Jushi Kogyo Kabushiki Kaisha, Japan was used as the injection machine S. The injection molding machine had a screw diameter of 36 mm, an injection rate of 12.3 cm/sec, an injection pressure of 1825 kgf/cm$^2$, a screw rotation speed of 0 to 190 rpm at high torque and 0 to 250 rpm at low torque, and a back pressure of 60 kgf/cm$^2$. The experiment was made under injection conditions that the injection rate, injection pressure, screw rotation speed, back pressure and variable are set to be 98%, 98%, 90%, 30% and 40 mm, respectively.

The forming mold A used was constructed by forming a punched metal wholly formed with holes of about 1.2 mm in diameter and having a thickness of 1.5 mm into a box-like shape (100 mm×100 mm×50 mm) by welding and the like. The chamber 5 was formed into a volume 50 1 in such a manner as shown in FIG. 4 uated to a gauge pressure of 750 mmHg.

Results of Experiment

The results were as shown in Table 1.

TABLE 1

| Release Lapse Time (sec) | Pressure Reduction Time (sec) | Volume (cc) | Density (g/cc) | State |
| --- | --- | --- | --- | --- |
| 0 | 5 | 635 | 0.041 | Δ |
| 5 | 0 | 454 | 0.050 | X |
| 5 | 10 | 504 | 0.046 | ○ |
| 5 | 20 | 502 | 0.046 | ○ |
| 5 | 30 | 526 | 0.043 | ○ |
| 5 | 120 | 531 | 0.043 | ○ |
| 1 | 30 | 608 | 0.042 | |

In Table 1, X indicates that the resin foam exhibited remarkable shrinkage, Δ indicates that the resin foam was formed with a lot of voids, ○ indicates that the foam was decreased in shrinkage, and ⊙ indicates that the foam was substantially free of shrinkage. The pressure reduction time "0" indicates that the chamber 5 was kept from being evacuated for pressure reduction, resulting in being kept at an atmospheric pressure. As will be noted from the results shown in Table 1, evacuation for pressure reduction permits shrinkage of the biodegradable resin to be decreased.

Figure 5:
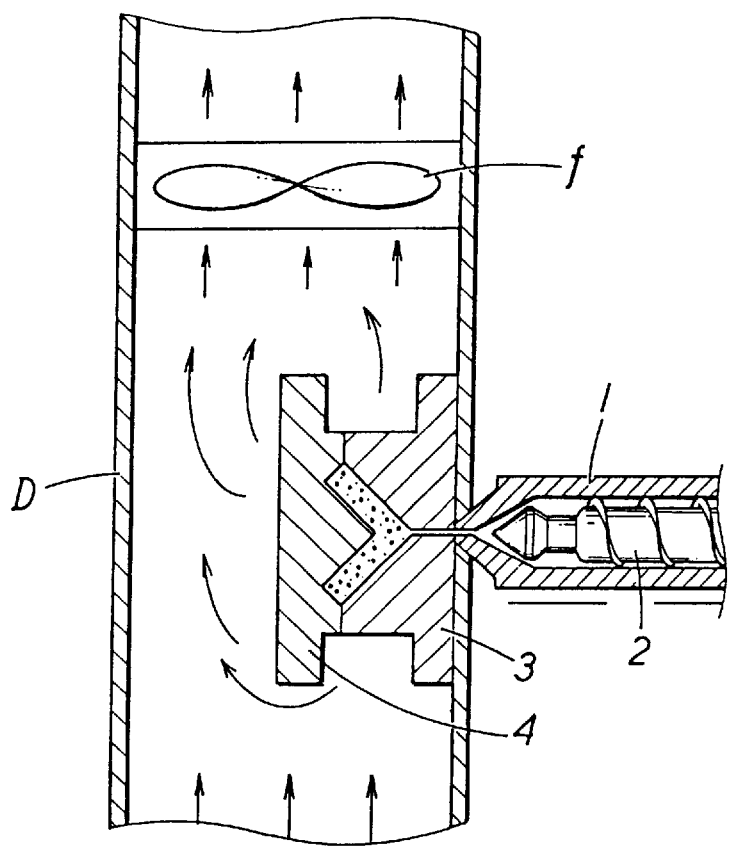
FIG. 5 is a vertical sectional side elevation view showing an essential part of a further example of the apparatus suitable for use for practicing the method of FIG. 1.

In the illustrated embodiment, a timing of evacuation for pressure reduction in the chamber 5 may be set before, during or after extrusion of the biodegradable resin via the narrowed opening 1a into the forming mold A. Alternatively, the above-described pressure reduction due to evacuation of an atmosphere surrounding the forming mold A may be replaced with a means shown in FIG. 5. More particularly, the forming mold A is located in a ventilating duct D having a fan f arranged therein, so that moisture may be removed from an interior of the forming mold A by actuation of the fan f, to thereby keep the resin foam from being contacted with the moisture.

Although narrowed opening 1a is kept open and the hopper 11 of the cylinder 1 is also kept open, the cylinder 1 is kept closed to a certain degree. However, a decrease in degree of closing of the cylinder 1 causes pressurization in the cylinder 1 to be insufficient, so that there is a possibility that a relationship between a softening point or melting point of the biodegradable resin and a boiling point of moisture or water pressurized in the cylinder causes the moisture to be partially vaporized, resulting in foaming of the biodegradable resin occurring in the cylinder 1 prior to injection of the resin into the forming mold. Also, this tends to cause foaming of the biodegradable resin extruded from the narrowed opening 1a while causing it to hang down from the narrowed opening 1a. In order to avoid such a problem, it is preferable that the illustrated embodiment is provided with a means for increasing a degree of closing of the cylinder 1. For this purpose, the narrowed opening 1a may be provided with a nozzle equipped with a shut-off valve. Alternatively, the hopper 11 for feeding the starting material to the cylinder 1 may be constructed so as to be tightly closed. Also, the hopper may be provided with a rotary valve. Further, foaming of the biodegradable resin in the cylinder 1 prior to the injection may be restrained by dissolving a non-volatile solute such as polyethylene glycol in water and then adding the resultant solution to the biodegradable resin to increase a boiling point of water.

When the hygroscopic fine particles described above is added to the biodegradable resin, production of the biodegradable resin foam B is not limited to extrusion of the biodegradable resin from the injection molding machine or injection machine S into the forming mold A. It may be carried out in such a manner that the forming mold A in which the biodegradable resin having the hygroscopic fine-particle material previously dispersed therein is charged is arranged in a closed heating vessel and then the heating vessel is fed with heated water vapor, followed by a rapid decrease in pressure in the heating vessel. The hygroscopic fine-particle material is not limited to a round powdery configuration. It may be formed into a shape like a thin piece or a rod-like shape.

In the illustrated embodiment, it is not necessarily required to add the hygroscopic fine-particle material to the biodegradable resin. The biodegradable resin may have water previously contained therein. Alternatively, biodegradable resin containing equilibrium moisture under an atmospheric pressure may, be used for the present invention. Also, the biodegradable resin and moisture or water may be separately added to the hopper 1.

In the illustrated embodiment, extrusion of the fluidized biodegradable resin into the forming mold may be carried out while placing a nozzle arranged with respect to the narrowed opening in the depths of the forming mold at the time when operation of the nozzle is started and retracting the nozzle relative to the forming mold during extrusion of the biodegradable resin. This may be carried out by means of an apparatus constructed in such a manner as shown in FIG. 6.

Figure 6:
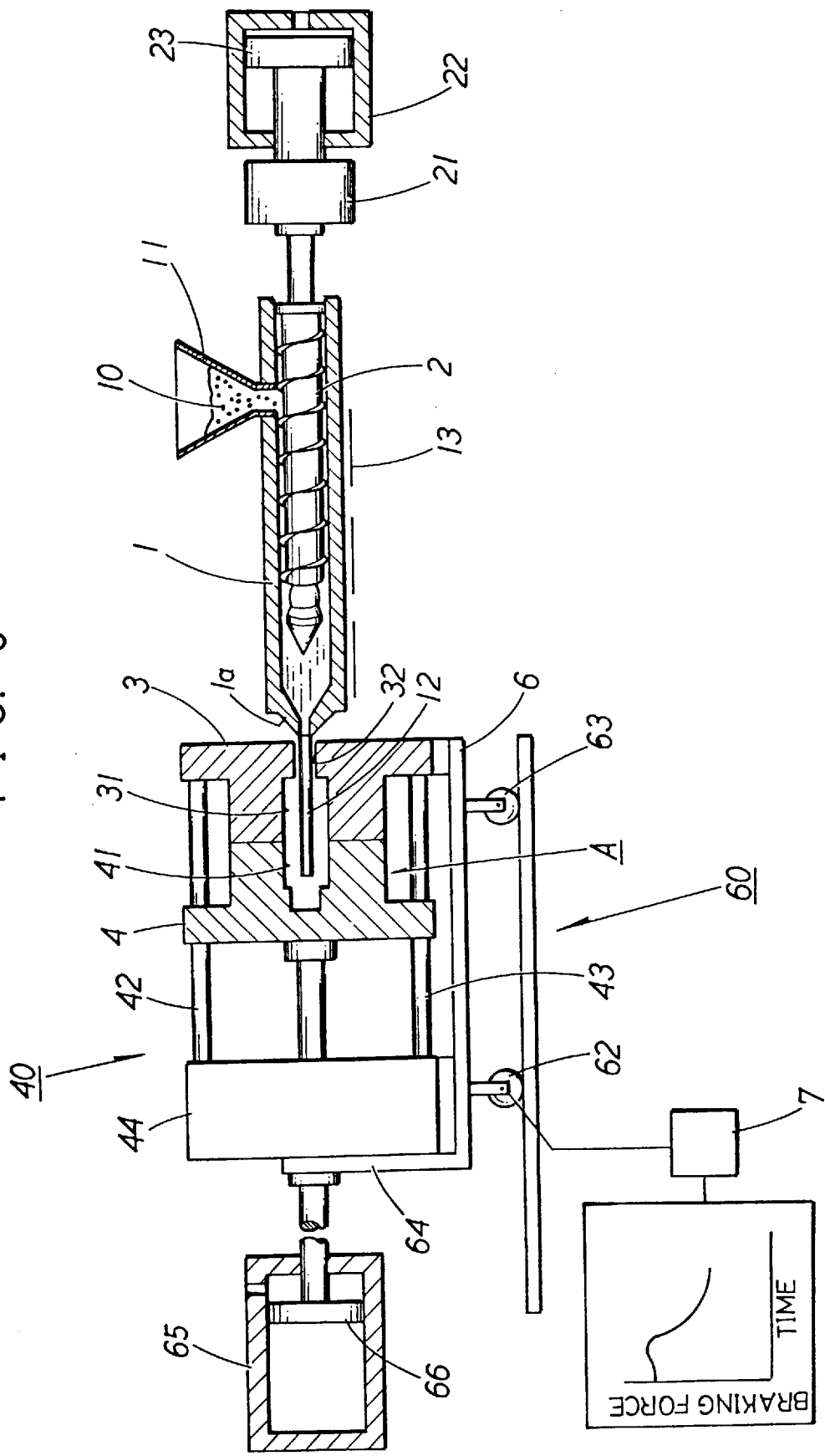
FIG. 6 is a vertical sectional side elevation view generally showing an example of an apparatus suitable for use for practicing another embodiment of a method for producing a biodegradable resin foam according to the present invention.

The apparatus shown in FIG. 6 includes an elongated nozzle 16 connected to a narrowed opening 1a so as to forwardly outwardly extend in a longitudinal direction of a cylinder 1. In correspondence to arrangement of the nozzle 16, a heater 13 may be arranged in the nozzle 12 as well as around the cylinder 1. Also, a fixed mold part 3 of a forming mold A is formed with a through-hole 32 communicating with a cavity 31, so that the nozzle 12 may be inserted into the fixed mold part 3 via the through-hole 32.

Also, in the embodiment of FIG. 6, the forming mold A and a mold clamp mechanism 40 are supported on a carrier base 6, which is moved on a guide rails 61 through wheels 62 and 63 mounted on a lower surface thereof. The carrier base 6 is mounted on a rear end thereof or a left-hand end thereon in FIG. 6 with a frame plate member 64, which has a piston 66 connected thereto so as to forwardly extend therefrom. The piston 66 is arranged so as to be reciprocated in a hydraulic cylinder 65. The hydraulic cylinder 65 is fixed on a suitable support (not shown) and functions to apply a hydraulic pressure to the piston 66 to move the carrier base 6. Thus, in the illustrated embodiment, the carrier base 6, guide rails 61, wheels 63, frame plate member 64, hydraulic cylinder 65 and piston 66 cooperate with each other to provide an access mechanism 60. Alternatively, the illustrated embodiment may be so constructed that the carrier base 6 may be freely moved by a pressure due to extrusion of biodegradable resin without arrangement of the hydraulic cylinder 65 and piston 66. In this instance, an actuation control mechanism 7 including an electromagnet and having a field current adjustment section 71 connected thereto is arranged on the wheel 62 to control a speed of retraction of the carrier base 6. The remaining part of the illustrated embodiment may be constructed in substantially the same manner as the embodiment described above with reference to FIG. 1.

The manner of operation of the apparatus of FIG. 6 constructed as described above will be described hereinafter. The apparatus is adapted to extrude fluidized biodegradable resin into the forming mold while placing the nozzle arranged with respect to the narrowed opening in the depths of the forming mold at the time when operation of the nozzle is started and retracting the nozzle relative to the forming mold during extrusion of the biodegradable resin.

More particularly, the forming mold A is kept clamped and the carrier base 6 is positioned at a forward position so that a distal end of the nozzle 12 arranged at the narrowed opening 1a is positioned in the depths of the forming mold A. Such arrangement of the nozzle 12 may be attained through a stopper provided on, for example, the guide rail 61. Then, particles 10 of biodegradable resin and moisture are fed to a hopper 1 and forwardly forcibly transferred in the cylinder 2 by means of a screw 2, during which the biodegradable resin particles 10 are increased in temperature to a level near a softening point of the resin or a melting point thereof by shearing force due to rotation of the screw 2 and heat applied thereto from the heater 13. This results in the biodegradable resin being collected in an inner space of the cylinder 1 defined on a side of a distal end of the screw 2 while being fluidized.

Figure 7A:
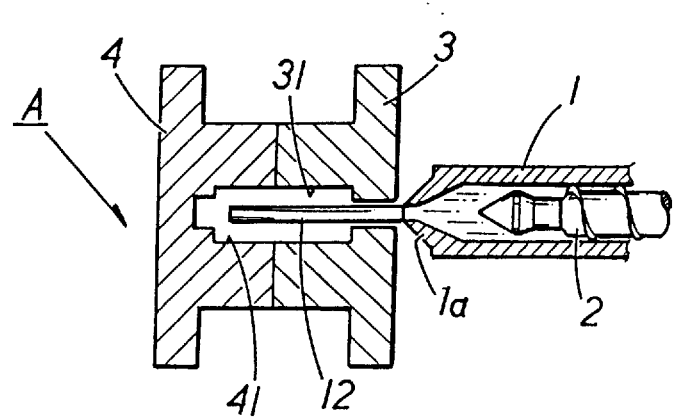
FIGS. 7(a) to 7(c) each are a schematic sectional view showing each of steps of the method of FIG. 6.

At this time, the inner space of the cylinder 1 is kept heated and pressurized, so that moisture contained in the biodegradable resin particles 10 is kept trapped in the biodegradable resin without evaporating therefrom. Then, rotation of the screw 2 is stopped and a piston 23 in an injection cylinder 22 is actuated to advance the screw 2 as shown in FIG. 7(a), so that the fluidized biodegradable resin may be injected from the cylinder 1 through the nozzle 12 into a forming space R in the forming mold A at a stretch.

Figure 7B:
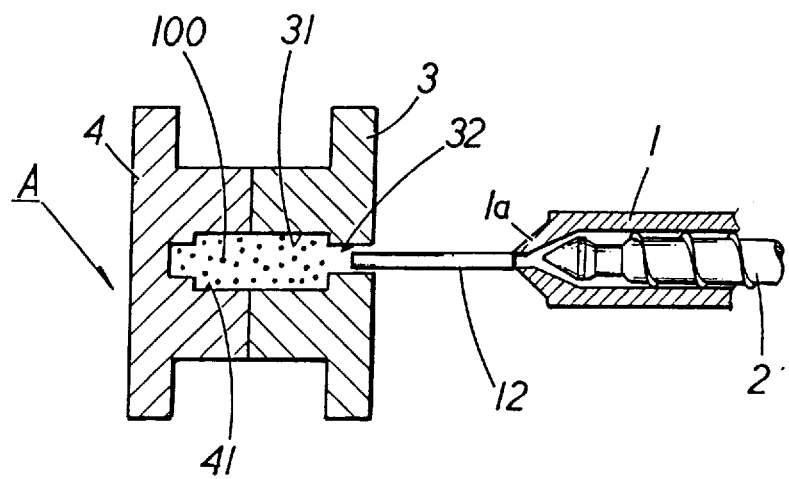
Figure 7C:
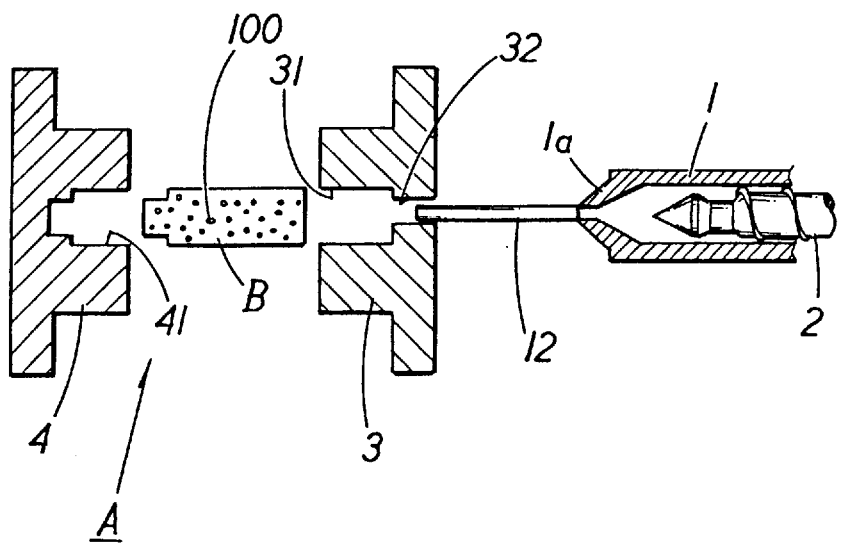

This causes the biodegradable resin to be rapidly exposed to an atmospheric pressure, so that moisture trapped in the resin is caused to instantaneously evaporate from the resin to foam the resin and the forming mold A is retracted rearwardly or in a left-hand direction in FIG. 7 by a hydraulic pressure of the hydraulic cylinder 65. This results in the biodegradable resin successively foaming while being extruded in order from a side of the depths of the forming mold A. A speed at which the forming mold A is retracted is adjusted by hydraulic control of the hydraulic cylinder 65. An excessive increase in speed of the forming mold A causes an excessive amount of biodegradable resin to be extruded in an entrance section of the forming mold A, leading to positionally non-uniform foaming of the resin; whereas an excessive decrease in speed of the mold A causes cells of biodegradable resin foamed in the depths of the mold A to be collapsed by biodegradable resin extruded subsequently thereto. Thus, it is desirable that a speed of retraction of the forming mold A is determined so as to permit the biodegradable resin to be successively extruded in a suitable amount in turn from a side of the depths of the mold A. Expansion force of water vapor occurs in the biodegradable resin. However, an outermost portion of the biodegradable resin is kept contacted with the forming mold A, to thereby regulated by a configuration of a cavity 31 and the water vapor is outwardly discharged through pores of the forming mold A, so that a biodegradable resin foam B integrally formed may be obtained. Then, the screw 2 is retracted while being rotated as shown in FIG. 7(c), during which collection of the next biodegradable resin fluidized in the inner space of the cylinder 1 on the side of the distal end of the screw 2 starts for the next injection. Concurrently, the biodegradable resin foam product formed in the cavity 31 of the forming mold A is allowed to be cooled and solidified, so that releasing of the forming mold A from clamping by the clamp mechanism 40 permits the resin foam B to be removed from the cavity 31, followed by clamping of the mold A for the next operation.

As noted from the above, the illustrated embodiment is so constructed that the nozzle 12 is initially positioned in the depths of the forming mold A and then successively retracted while extruding the biodegradable resin into the forming mold A, to thereby permit extrusion of the biodegradable resin to be carried out while keeping a portion of an inner space of the mold to be subsequently charged with the biodegradable resin and an extrusion port of the nozzle 12 in proximity to each other. Thus, the illustrated embodiment constantly keeps the biodegradable resin successively extruded into a portion of the forming mold A at which foaming of the resin is desired. This permits the foaming to be completed while ensuring that the biodegradable resin extends well through the forming mold A, to thereby substantially eliminate the above-described disadvantage that foamed cells of the biodegradable resin collected while being separated from an inner surface of the forming mold A are forced by the following biodegradable resin, resulting in being collapsed. Thus, the biodegradable resin foam B produced by the apparatus of the illustrated embodiment can be constructed into a desired configuration and uniformity sufficient to exhibit satisfactory cushioning properties.

In the illustrated embodiment, relative movement between the forming mold A and the nozzle 12 is accomplished by movement of the forming mold A retractably constructed. Alternatively, it may be attained by constructing the injection machine S in a retractable manner. Also, both may be retractably constructed. A speed of relative movement between the mold A and the nozzle 12 may be controlled through, for example, the hydraulic cylinder 65. Such construction permits foaming density (filling degree) of the biodegradable resin foam B to be controlled, to thereby vary properties of the foam B. For example, this permits the foam B to be formed so as to have a hardened surface and a softened inner layer.

Figure 8:
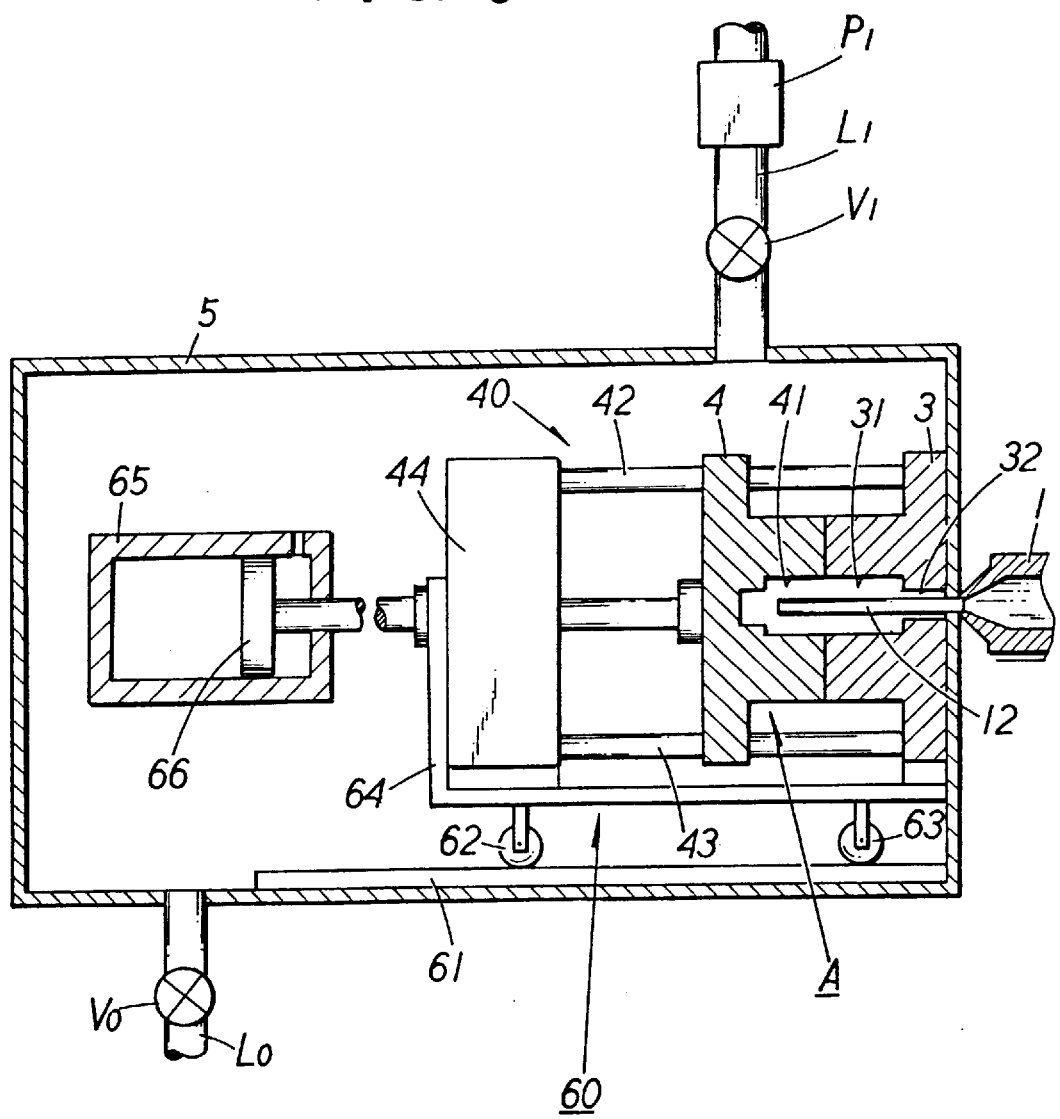
FIG. 8 is a vertical sectional side elevation view showing an essential part of another example of the apparatus suitable for use for practicing the method shown in FIG. 6.

The nozzle 12 may be formed at an outlet port thereof into a diameter decreased to a degree sufficient to permit the biodegradable resin to be injected while being atomized. This permits the biodegradable resin foam of satisfactory properties to be produced even when the forming mold A is formed into a complicated configuration. Also, the illustrated embodiment may be modified in such a manner as shown in FIG. 8. In a modification of FIG. 8, a forming mold A and a mold clamp mechanism 40 are received in a chamber 5 constructed in an airtight manner. Also, a pressure reducing pipe $L_1$ provided with a pressure reducing pump $P_1$ and a pressure reducing valve $V_1$ and an atmospheric pressure releasing pipe $L_0$ provided with an atmospheric pressure releasing valve $V_0$ are connected to the chamber 5 to reduce a pressure in the chamber 5 through actuation of the pressure reducing pump $P_1$. Such construction permits water vapor generated from biodegradable resin to be forcibly outwardly discharged from a circumference of the forming mold A, to thereby substantially restrain shrinkage of a biodegradable resin foam due to re-adhesion of water vapor contributing to foaming of biodegradable resin to the foam. Alternatively, such an advantage can be exhibited also by ventilation of the chamber 5 rather than pressure reduction in the chamber. In this instance, the chamber 5 and mold clamp mechanism 40 may be constructed so as to surround the forming mold A and located outside the chamber 5, respectively.

In the method for producing the biodegradable resin foam according to the present invention, the step of extruding the fluidized biodegradable resin into the forming mold may be carried out in a manner to keep an atmosphere in the forming mold pressurized during the extrusion and rapidly reduce a pressure of the atmosphere in the forming mold after completion of the extrusion. This may be carried out by means of an apparatus constructed in such a manner as shown in FIG. 9.

The apparatus shown in FIG. 9 includes a chamber 5 having a pressuring pipe $L_3$ and a pressure reducing and releasing pipe $L_4$ connected thereto, other than the pressure reducing pipe $L_1$, pressure reducing valve $V_1$ and pressure reducing pump $P_1$ arranged in the apparatus shown in FIG. 1. The pressuring pipe $L_3$ is connected through a pressuring valve $V_3$ to a compressor C to pressurize an atmosphere in the chamber 5. The pressure reducing and releasing pipe $L_4$ corresponds to the atmospheric pressure releasing pipe $L_0$ arranged in the apparatus shown in FIG. 1 and is arranged so as to communicate through a pressure reducing and releasing valve $V_4$ to an ambient atmosphere. The remaining part of the apparatus may be constructed in substantially the same manner as the apparatus shown in FIG. 1.

Now, the extrusion step executed by means of the apparatus of FIG. 9 constructed as described above will be described hereinafter. First, the forming mold A is kept clamped and the chamber 5 acting as a pressure adjusting chamber is kept pressurized by the compressor C. Then, as shown in FIG. 9, a hopper 11 is fed with particles 10 of moisture and biodegradable resin which constitute a biodegradable resin starting material. The starting material is then forcibly forwardly transferred in the cylinder 1 by means of a screw 2, during which the biodegradable resin particles 10 are increased in temperature to a level near a softening point of the resin or a melting point thereof by shearing force due to rotation of the screw 2 and heat applied thereto from a heater 13. This results in the biodegradable resin being collected in an inner space of the cylinder 1 defined on a distal end side of the screw 2 while being fluidized.

At this time, the inner space is kept heated and pressurized, so that moisture contained in the biodegradable resin particles 10 is kept trapped in the biodegradable resin without evaporating therefrom. Then, rotation of the screw 2 is stopped and a piston 23 in an injection cylinder 22 is actuated to advance the screw 2 as shown in FIG. 10(a), so that the fluidized biodegradable resin may be injected from the cylinder 1 through a narrowed opening 1a into a forming space R in the forming mold A at a stretch.

An inner space of the chamber 5 is kept pressurized, so that a cavity 31 and a core 41 of an air-permeable forming mold A communicating through pores of the forming mold A with the inner space of the chamber 5 is likewise pressurized. In this instance, when a pressure in the forming space R defined by the cavity 31 and core 41 is set at a level of, for example, 10 kgf/cm² higher than a water vapor pressure at a temperature of the biodegradable resin injected through the narrowed opening or port 1a or, for example, at 170° C., the biodegradable resin may be extruded into the forming space R while keeping moisture trapped therein.

After the biodegradable resin is charged in the forming space R of the forming mold A, the pressure reducing and releasing valve $V_4$ is rapidly and fully rendered open to permit a pressure in the chamber 5 to be reduced to an atmospheric pressure, so that the biodegradable resin in a heated and pressurized state is rapidly exposed to an atmospheric pressure, resulting in moisture trapped in the resin being instantaneously vaporized to foam the biodegradable resin. Also, vaporization of the moisture causes expansion force of water vapor to occur in the biodegradable resin. However, an outermost portion of the biodegradable resin is kept contacted with an outer surface of the forming mold A, to thereby be regulated by a configuration of the cavity 31 and core 41 and the water vapor is outwardly discharged through the pores of the forming mold A, so that such a biodegradable resin foam B integrally formed as shown in FIG. 3 may be obtained.

Then, the screw 2 is retracted while being rotated as shown in FIG. 10(c), during which collection of the following biodegradable resin fluidized in the inner space of the cylinder 1 on the side of the distal end of the screw 2 starts for the next injection. Concurrently, the biodegradable resin foam B formed in the cavity 31 of the forming mold A is allowed to be cooled and solidified, so that releasing of the forming mold A from the clamping permits the resin foam B to be removed from the cavity 31, followed by clamping of the forming mold A for the next operation.

In the method described above, the forming space R defined by the cavity 31 and core 41 is kept pressurized until the fluidized biodegradable resin is injected from the cylinder 1 through the narrowed opening 1a into the forming space R, to thereby prevent foaming of the biodegradable resin. Then, a pressure in the forming space R is rapidly decreased to lead to foaming of the resin, so that the biodegradable resin foam B obtained may conform to a configuration of the forming mold A and exhibit uniformity, resulting in being effectively applied to a satisfactory cushioning material.

Thus, in the method practiced by means of the apparatus of FIG. 9, a timing of foaming of the biodegradable resin extruded through the narrowed opening 1a is adjusted by reducing a pressure in the chamber 5. The timing of pressure reduction or foaming is not limited to setting after the biodegradable resin is fully filled in the forming space R. The pressure reduction may be carried out in the course of extrusion of the resin through the narrowed opening 1a into the forming space R. Thus, the timing may be suitably set depending on, for example, a speed at which the biodegradable resin is extruded through the narrowed opening 1a, a temperature at which the biodegradable resin is heated, and the like.

A pressure in the chamber 5 may be reduced to a level lower than, equal to or higher than an atmospheric pressure. Reduction of the pressure to a level lower than an atmospheric pressure permits a pressure difference obtained to be substantially increased, resulting in foaming of the biodegradable resin being carried out to an increased degree. Also, this leads to discharge of water vapor to an exterior of the chamber 5, to thereby prevent shrinkage of the biodegradable resin foam due to re-adhesion of moisture once contributing to the foaming to the resin foam.

The apparatus of FIG. 9 may be modified in such a manner as shown in FIG. 11. More particularly, an apparatus of FIG. 11 is so constructed that a chamber 5 is divided into a movable-side part 51 and a fixed-side part 52 and the movable-side part 51 is arranged so as to be movable integrally with a movable mold part 4. Such construction permits a forming mold A and the chamber 5 to be concurrently operated, to thereby facilitate removal of a biodegradable resin foam from the forming mold A and chamber 5.

Figure 12:
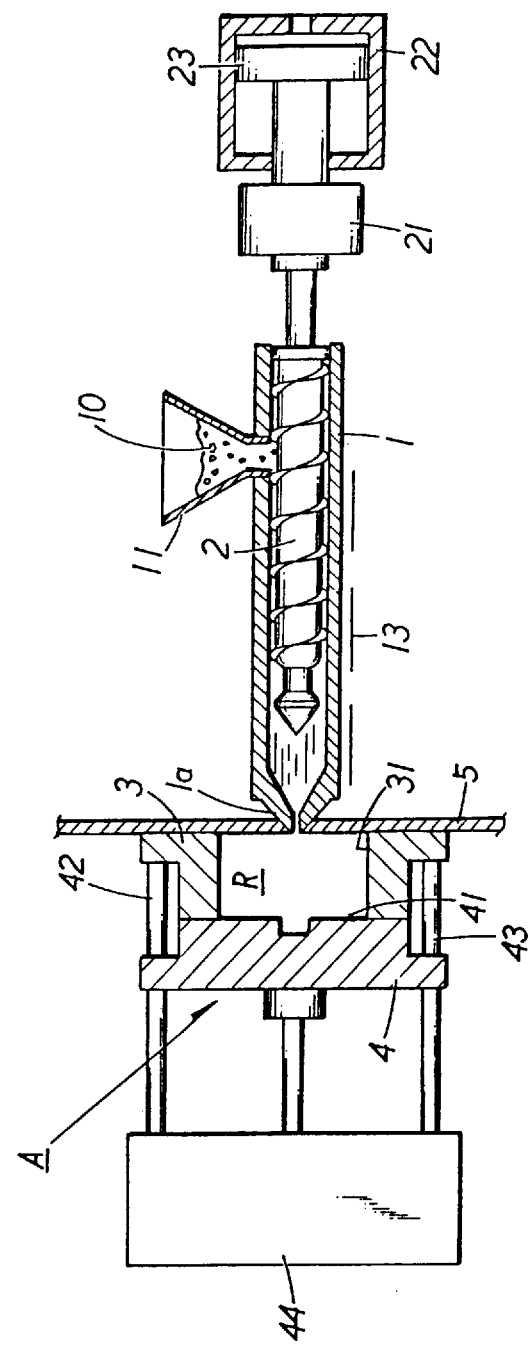
FIG. 12 is a vertical sectional side elevation view generally showing an example of an apparatus suitable for use for practicing still another embodiment of a method for producing a biodegradable resin foam according to the present invention.

In the method of the present invention, extrusion of the fluidized biodegradable resin into the forming mold is carried out by injecting the biodegradable resin into the forming mold while keeping the resin atomized. Such extrusion may be executed by means of an apparatus as shown in FIG. 12. Therefore, the apparatus of FIG. 12 will be described prior to description of the extrusion step.

In the apparatus of FIG. 12, a cavity 31 is formed into a rectangular shape and more particularly a rectangular parallelepiped shape and a core 41 is formed into a small rectangular parallelepiped shape communicating with the cavity 31. Also, a narrowed opening 1a is formed into a diameter smaller than that of a nozzle of a conventional injection molding machine, to thereby ensure that fluidized biodegradable resin in a heated and pressurized state may be injected through the narrowed opening 1a into a forming space R defined by the cavity 31 and core 41 while being kept atomized. More particularly, the nozzle of the conventional injection molding machine is formed into a diameter of, for example, 2 to 5 mm, whereas in the illustrated embodiment, the narrowed opening 1a is formed into a diameter as small as about 1 mm.

The extrusion by means of the apparatus shown in FIG. 12 is initiated by feeding a hopper 11 with particles 10 of moisture and biodegradable resin while keeping a forming mold A clamped. Then, the particles 10, as shown in FIG. 13(a), are forwardly forcibly transferred in a cylinder 1 by means of a screw 2, during which the particles 10 are heated to a temperature near a softening point of the particles or a melting point thereof by shearing force due to rotation of the screw 2 and heat applied to the particles from a heater 13 and then collected in an inner space of the cylinder 1 defined on a side of a distal end of the screw 2 while being fluidized. At this time, the inner space of the cylinder 1 is kept heated and pressurized, so that moisture contained in the fluidized biodegradable resin is trapped therein without evaporating therefrom.

Then, as shown in FIG. 13(b), rotation of the screw 2 is stopped and a piston 23 in an injection cylinder 22 is actuated to advance the screw 2, resulting in the fluidized biodegradable resin being injected at a stretch through the narrowed opening 1a into the forming space R defined by the cavity 31 and core 41 while being kept atomized.

Injection of the resin while keeping it atomized may be carried out by forming the narrowed opening 1a into a small diameter as compared with that of the conventional injection molding machine and suitably adjusting a speed of injection of the fluidized resin and a difference between a pressure before the extrusion and that after the extrusion. A diameter of the narrowed opening 1a required for atomization of the resin is not limited to the above-described value of about 1 mm because it is also varied depending on a speed of extrusion of the fluidized resin as well.

An exterior of the forming mold A is permitted to communicate with an ambient atmosphere, resulting in the forming space R being kept at an atmospheric pressure because it likewise communicates through pores of the mold A with an ambient atmosphere. Thus, the biodegradable resin injected at a stretch into the forming space R while being atomized is rapidly exposed to an atmospheric pressure, so that moisture trapped in the resin is instantaneously vaporized to foam the biodegradable resin. Expansion force of the vaporized moisture or water vapor is exerted in the biodegradable resin, however, an outermost portion of the foamed resin is kept contacted with an inner surface of the forming mold A, resulting in being regulated by a configuration of the space R. Then, the water vapor formed is discharged through the pores of the forming mold A to an exterior of the mold A. Foaming of the biodegradable resin is carried out for every particle, resulting in foamed cells 100 being formed. The foamed particles are entangled with each other and melted with each other, leading to a biodegradable resin foam B integrally formed.

Then, as shown in FIG. 13(c), the screw 2 is retracted while being rotated, during which the following biodegradable resin fluidized is collected in the inner space of the cylinder 1 on the side of the distal end of the screw 2 for the next operation and the biodegradable resin foam B in the forming space R of the forming mold A is allowed to be cooled and solidified. Then, the forming mold A is released from clamping by the mold clamp mechanism, so that the biodegradable resin foam B may be removed from the mold A, followed by re-clamping of the mold A for the next operation.

In the method described above, the biodegradable resin fluidized is injected to the forming space R of an atmospheric pressure while being atomized, resulting in being spread throughout the forming space R irrespective of a configuration thereof. Also, this permits the particles constituting the atomized biodegradable resin to foam while being collected together. Therefore, even when the forming space R of the forming mold A is formed into a complicated shape, the method minimizes or substantially eliminates a disadvantage that the foamed cells of the biodegradable resin are collected at positions away from an inner surface of the forming mold, resulting in the foamed cells being collapsed due to forcing by subsequently extruded biodegradable resin. Thus, the biodegradable resin foam B obtained fully conforms to a configuration of the forming mold and exhibits uniformity, resulting in being effectively applied to a satisfactory cushioning material.

In the apparatus of the illustrated embodiment, an exterior of the forming mold A may be exposed to an atmosphere ventilated. This permits the water vapor to be forcibly outwardly discharged from the forming mold A, to thereby exhibit an advantage of effectively preventing moisture which has once contributed to foaming of the biodegradable resin from re-adhering to the resin foam, to thereby prevent shrinkage of the foam.

The forming mold A may be arranged in the chamber 5 to reduce a pressure in an atmosphere outside the forming mold A to a level below an atmospheric pressure. This permits a difference between a pressure outside the forming mold A and that inside the mold to be increased, so that the resin may be foamed to an increased degree and forced discharge of water vapor from the mold is increased to minimize condensation of the water vapor on the resin foam.

Figure 14:
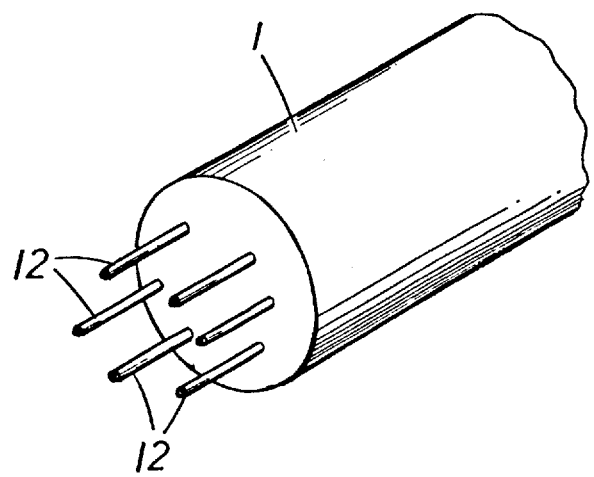
FIG. 14 is a perspective view showing a modification of a nozzle arranged with respect to a narrowed opening.
Figure 15:
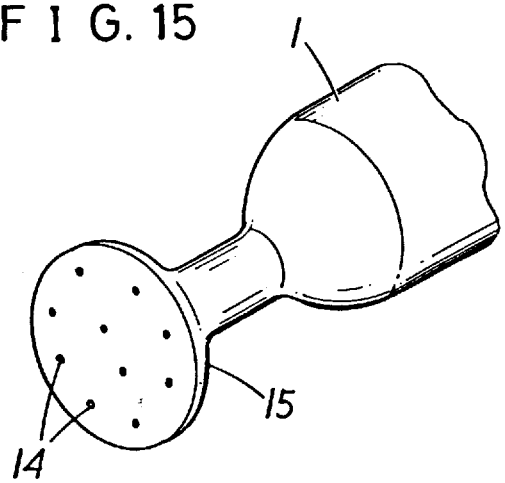
FIG. 15 is a perspective view showing a cylinder provided at a distal end thereof with a shower.

Also, in the illustrated embodiment, at least one nozzle 12 may be arranged with respect to the narrowed opening 1a as shown in FIG. 14. In FIG. 14, a plurality of such nozzles 12 are arranged on the cylinder 1. Alternatively, the cylinder 1 may be provided at a distal end thereof with a shower 15 formed with a plurality of fine injection ports 14. Also, when the embodiment: is so constructed that the biodegradable resin is injected into the forming mold A through a runner and a gate (not shown), the runner and gate each may be formed into a small diameter to ensure that the injection is carried out while keeping it atomized.

Figure 16:
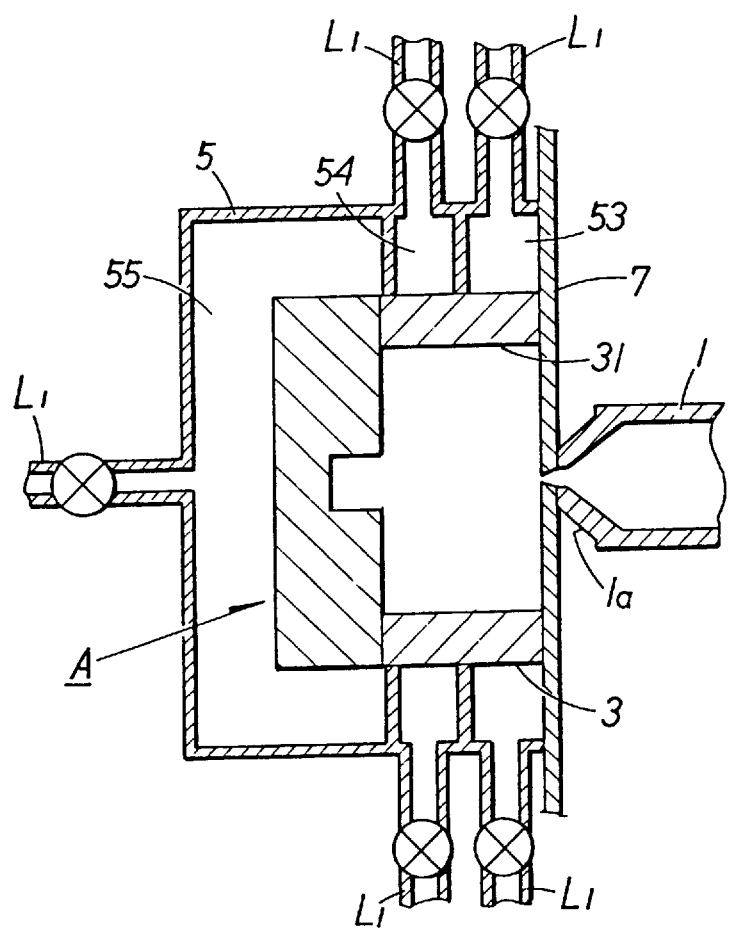
FIG. 16 is a vertical sectional side elevation view showing an essential part of another example of the apparatus suitable for use for practicing the method of FIG. 12.

Further, the apparatus of the illustrated embodiment may be constructed in such a manner as shown in FIG. 16. More particularly, the chamber 5 is divided into a plurality of pressure reducing chambers 53, 54 and 55 which are constructed so as to be airtight with respect to each other and arranged so as to surround the forming mold A. The chambers 53, 54 and 55 have pressure reducing pipes $L_1$ connected thereto, respectively. Thus, a degree of pressure reduction in each of the chambers may be varied through the pressure reducing pipe $L_1$, to thereby adjust filling of the biodegradable resin in of the forming space R of the forming mold A while being kept atomized, so that it may be charged in the forming space R in turn form the depths thereof with high efficiency. In this instance, the chamber 5 may be constructed so as to be operated in synchronism with the forming mold A.

In the method of the present invention, the biodegradable resin starting material may comprise moisture, biodegradable resin and a water repellent material. An apparatus suitable for practicing the method using the biodegradable resin starting material of such composition is shown in FIG. 17, which apparatus may be constructed in substantially the same manner as that shown in FIG. 1, except that the chamber 5 is eliminated. Particles 10 of biodegradable resin which contains a substantial amount of moisture and a water repellent material are charged in a hopper 11 and then forcibly forwardly transferred in a cylinder 1 by means of a screw 2, during which the biodegradable resin particles 10 are increased in temperature to a level near a softening point of the resin or a melting point thereof by shearing force due to rotation of the screw 2 and heat applied thereto from a heater 13 or a level, for example, of about 170° C. This results in the biodegradable resin being collected in an inner space of the cylinder 1 defined on a distal end side of the screw 2 while being fluidized.

At this time, the inner space of the cylinder 1 is kept heated and pressurized, so that moisture contained in the biodegradable resin particles 10 is kept trapped in the biodegradable resin without evaporating therefrom. Then, rotation of the screw 2 is stopped and a piston 23 in an injection cylinder 22 is actuated to advance the screw 2, so that the fluidized biodegradable resin may be injected through a narrowed opening 1a from the cylinder into a forming space R of the forming mold A at a stretch.

Figure 19:
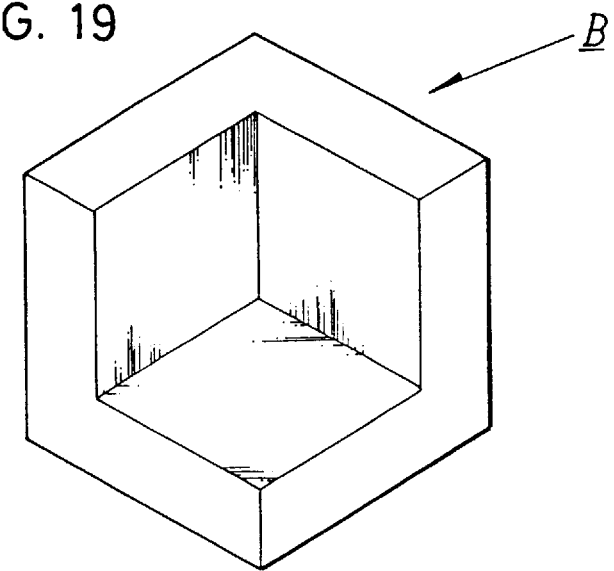
FIG. 19 is a perspective view showing another embodiment of a biodegradable resin foam according to the present invention.

This causes the biodegradable resin in a heated and pressurized state to be rapidly exposed to an atmospheric pressure, resulting in moisture trapped in the resin being instantaneously vaporized to foam the biodegradable resin. The above-described water repellent material has a boiling point higher than that of water, so that most of the water repellent material remains as a film on a surface of each of cells of the foamed biodegradable resin. Vaporization of the moisture causes expansion force of water vapor to occur in the biodegradable resin. However, an outermost portion of the biodegradable resin is kept contacted with an inner surface of the forming mold A, to thereby be regulated by a configuration of a forming space defined by a cavity 31 and a core 41, so that such a biodegradable resin foam B integrally formed as shown in FIG. 19 may be obtained.

Figure 18A:
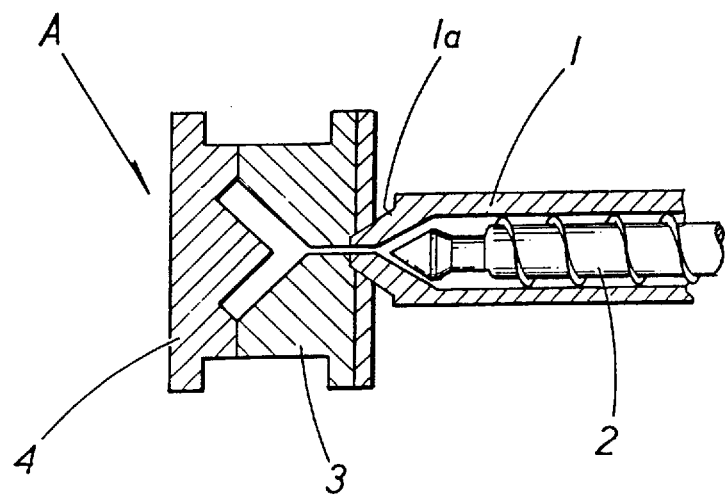
FIGS. 18(a) and 18(b) each are a schematic sectional view showing each of steps of the method of FIG. 17.
Figure 18B:
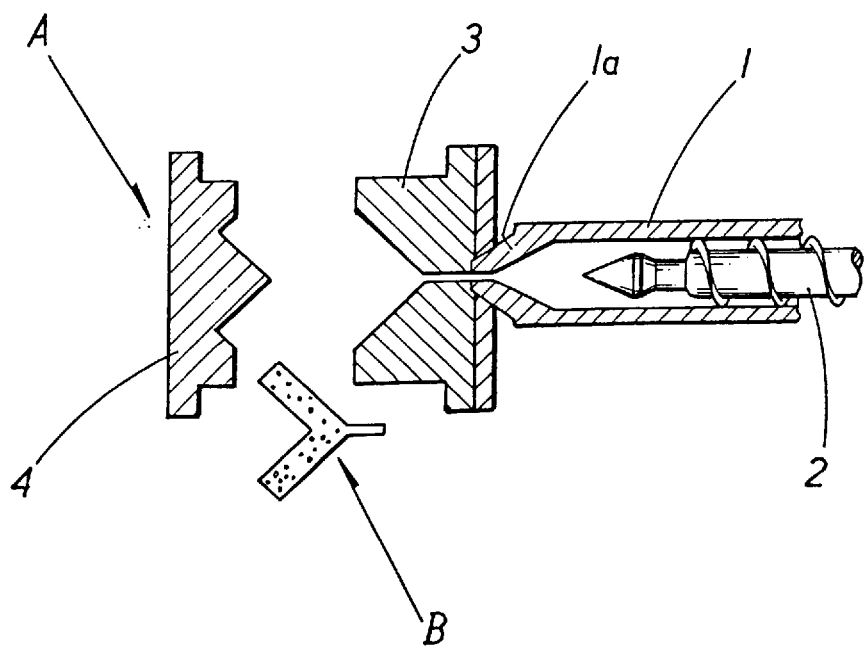

Then, the screw 2 is retracted while being rotated as shown in FIG. 18(b), so that the following biodegradable resin fluidized is collected in the inner space of the cylinder 1 on the side of the distal end of the screw 2 for the next injection. Concurrently, the biodegradable resin foam B formed in the cavity 31 of the forming mold A is allowed to be cooled and solidified, so that releasing of the forming mold A from clamping by a mold clamp mechanism permits the resin foam B to be removed from the cavity 31, followed by clamping of the mold A for the next operation.

In the method described above, the water repellent material forms a film for covering each of foamed cells of the biodegradable resin foam, to thereby effectively prevent the foamed cells from being collapsed or broken due to swelling and/or softening of the biodegradable resin caused by contact of the resin foam with water. More particularly, formation of the film exhibits a first advantage of preventing moisture which has once contributed to foaming of the biodegradable resin due to vaporization and expansion thereof from re-adhering to the foam product and a second advantage of minimizing softening and swelling of the resin foam in use. Also, when a natural fatty acid polymer may be used as the water repellent material, the whole biodegradable resin foam exhibits satisfactory biodegradable properties because the polymer is likewise biodegradable.

Figure 20:
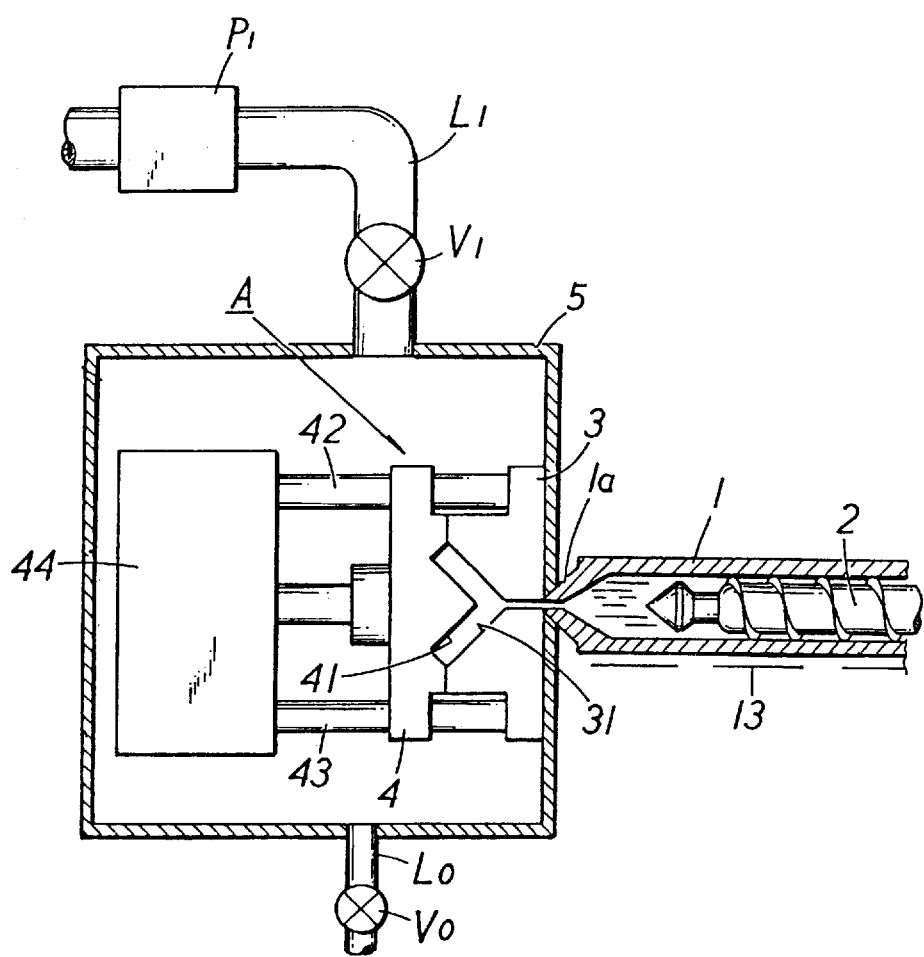
FIG. 20 is a vertical sectional side elevation view showing an essential part of another example of the apparatus suitable for use for practicing the method of FIG. 19.

The apparatus of the illustrated embodiment may be modified in such a manner as shown in FIG. 20. More particularly, in a modification of FIG. 20, a forming mold A is arranged in an airtight chamber 5 which can be divided into a movable-side part 51 and a fixed-side part 52, so that a pressure reducing valve $V_1$ is rendered open at a predetermined timing such as, for example, in a one second before or after extrusion of the biodegradable resin through a narrowed port 1a into a forming mold A, to thereby reduce a pressure in the chamber 5 through a pressure reducing pipe $L_1$ by means of a pressure reducing pump $P_1$. Alternatively, the illustrated embodiment may be constructed in substantially the same manner as the apparatus described above with reference to FIG. 5, wherein the forming mold A is arranged in the ventilation duct D which is forcibly ventilated by means of the suction fan f. Such constructions each permit moisture to be forcibly removed from the forming mold A, to thereby more positively prevent shrinkage of the biodegradable resin. In FIG. 20, reference character $L_0$ designates an atmospheric pressure releasing pipe and $V_0$ is an atmospheric pressure releasing valve arranged in the middle of the pipe $L_0$.

In the illustrated embodiment, the biodegradable resin particles 10, moisture and water repellent material are charged separately in the hopper 11. Alternatively, the cylinder 1 may be provided with an inlet port, through which the moisture or water repellent material may be fed directly to the cylinder 1. Also, the illustrated embodiment may provide a single biodegradable resin foam through the forming mold A by each batch production. Alternatively, the resin foam may be extruded through a cap, to thereby be obtained in the form of a continuous rod of a suitable sectional configuration corresponding to a configuration of the cap. In this instance, a plurality of the rod-like resin foams which have been extruded or is being foamed are combined with each other to provide a continuous rod-like product of an increased thickness.

Further, an air-permeable cylinder in place of the forming mold A may be arranged in front of the narrowed opening 1a, so that a plurality of foam products extruded through the cylinder are joined in parallel to each other by means of an adhesive. Alternatively, the resin foams are joined together immediately after the formation, resulting in being adhered together by means of moisture on the surface. Thus, a single continuous resin foam may be provided.

The present invention is not limited to foaming by extrusion through an injection molding machine or the like. For example, the present invention may be conveniently applied to foaming practiced according to a procedure wherein the air-permeable foaming mold A is arranged in a closed heating vessel, a predetermined amount of biodegradable resin containing a water repellent material is charged in the forming mold A, heated water vapor is introduced into the heating vessel and then a pressure in the heating vessel is reduced. Also, in the present invention, the step of foaming the biodegradable resin and the step of subjecting the foamed resin to formation may be carried out separately.

Now, embodiments of an apparatus of the present invention which is featured in a pressure adjusting mechanism arranged in a forming mold A and embodiments of a method of the present invention practiced by means of the apparatus of such a featured structure will be described hereinafter.

Figure 21:
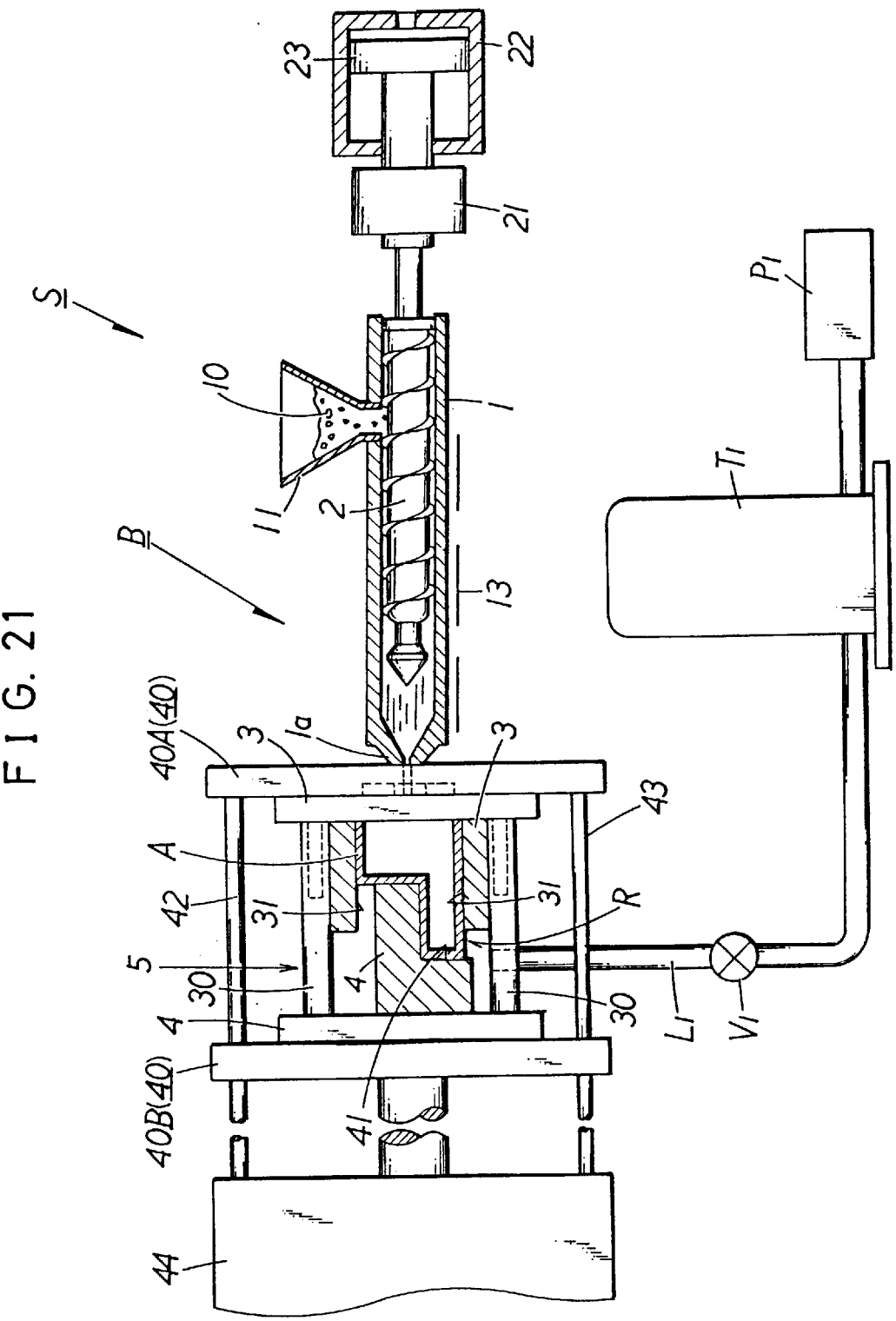
FIG. 21 is a vertical sectional side elevation view generally showing an embodiment of an apparatus for producing a biodegradable resin foam according to the present invention.

Referring first to FIG. 21, an embodiment of an apparatus of the present invention is illustrated. In an apparatus of the illustrated embodiment, it is desirable that a narrowed opening 1a or a nozzle 12 provided at the narrowed opening 1a is formed into a diameter of about 6 mm. Also, when the nozzle 12 is arranged at the narrowed opening 1a, the nozzle 12 is preferably equipped with a shut-off valve.

Now, the apparatus of FIG. 21 will be substantially described in connection with differences between the apparatus of FIG. 21 and that shown in FIG. 1. The apparatus of FIG. 21 includes a chamber 5 arranged at a distal end of an injection machine S so as to act as a pressure adjusting chamber. In the illustrated embodiment, the chamber 5 is constituted by a mold of a so-called injection molding machine and includes a fixed mold part 3 formed with a cavity 31 communicating with the narrowed opening 1a and a movable mold part 4 formed with a core 41. The fixed mold part 3 and movable mold part 4 are mounted on a fixed-side mold plate 40A of a mold clamp mechanism 40 and a movable-side mold plate 40B thereof, respectively. The cavity 31 is formed into, for example, a rectangular shape and cooperates with the core 41 likewise formed into a rectangular shape to provide a forming space R, in which an air-permeable forming mold A is arranged.

In the illustrated embodiment, the forming space R for the forming mold A is formed into a rectangular configuration having a L-shape in section as a corner angle and the forming space R is fixedly positioned by means of a positioning rod 30 arranged in the chamber 5. However, the forming space R for the forming mold A is limited to any specific configuration. Therefore, a plurality of such forming molds A different in configuration which are previously prepared may be suitably replaced with each other as desired. In the illustrated embodiment, the chamber and mold clamp mechanism 40 are open to an ambient atmosphere.

The chamber 5 has a pressure reducing pipe $L_1$ connected thereto, which is provided in the middle thereof with a pressure reducing valve $V_1$ and then connected through the pressure reducing valve $V_1$ to a pressure reducing tank $T_1$. The pressure reducing tank $T_1$ is also connected thereto a pressure reducing pump $P_1$. The pressure reducing tank $T_1$ is reduced in pressure to a predetermined level near, for example, a vacuum and is adapted to communicate with the chamber 5 when the pressure reducing valve $V_1$ is open. The pressure reducing tank $T_1$ is required to have a volume sufficient to permit a pressure in the chamber 5 to be rapidly reduced when it communicates with the chamber 5. The remaining part of the apparatus of the illustrated embodiment may be constructed in substantially the same manner as the apparatus shown in FIG. 1.

Now, formation of a biodegradable resin foam by means of the apparatus of the illustrated embodiment will be described hereinafter with reference to FIG. 21.

First, the chamber 5 is clamped by the mold clamp mechanism 40 and closed while keeping an inner space thereof at, for example, an atmospheric pressure. Biodegradable resin fluidized as previously described is injected at a stretch from a cylinder 1 through the narrowed opening 1a into the forming mold A. After the injection, the pressure reducing valve $V_1$ is rendered open to communicate the pressure reducing tank $T_1$ with the chamber 5, to thereby rapidly reduce a pressure in the chamber 5 to a gauge pressure of, for example, about 750 mmHg. This causes moisture trapped in the biodegradable resin to be instantaneously vaporized to foam the resin. The resultant water vapor is caused to be discharged at a stretch through pores of the forming mold A to the pressure reducing tank $T_1$. Concurrently, expansion force due to vaporization of the water vapor is exerted in the biodegradable resin, however, an outermost portion of the resin is kept contacted with the forming space R defined by the cavity 31 and core 41, resulting in being regulated by a configuration of the space R. Thus, a biodegradable resin foam of a predetermined configuration is provided.

Then, the pressure reducing valve $V_1$ is closed to interrupt communication between the pressure reducing tank $T_1$ an the chamber 5 and then a screw 2 is retracted while being rotated, during which the following or subsequent biodegradable resin is collected in an internal space of the cylinder 1 defined on a side of a distal end of the screw 2 while being fluidized, resulting in being ready for the next operation. Concurrently, the pressure reducing pump $P_1$ is actuated to reduce a pressure in the pressure reducing tank $T_1$ to the initial level again, during which the biodegradable resin foam in the forming mold A is allowed to be cooled and solidified. Then, the movable mold part 4 is moved away from the fixed mold part 3 to open the forming mold A, so that the biodegradable resin foam may be removed from the mold A, followed by re-clamping of the mold A for the next operation.

Figure 22:
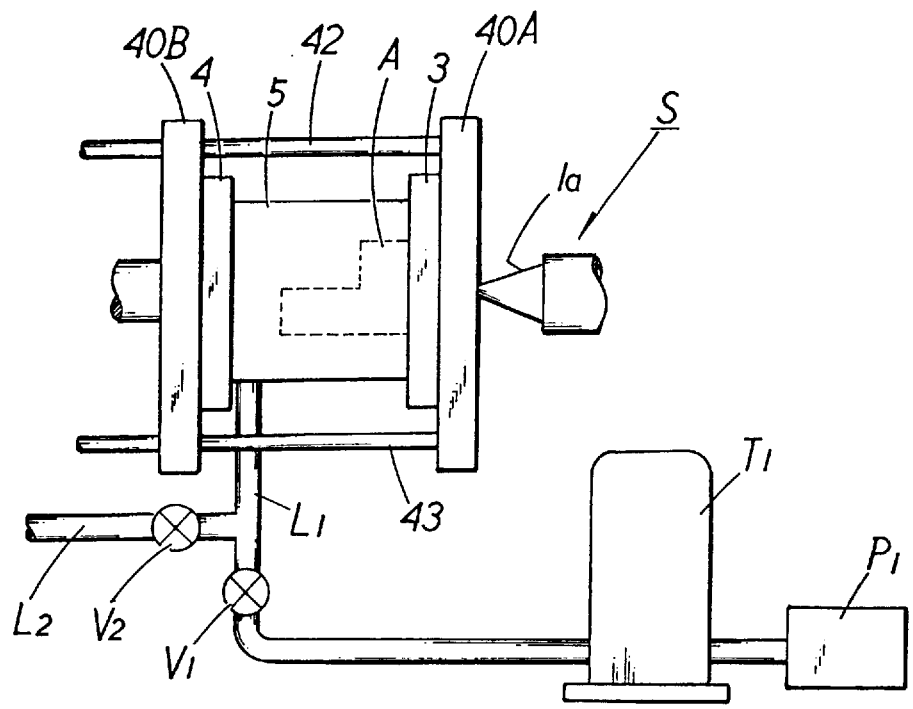
FIG. 22 is a side elevation view showing an essential part of another embodiment of an apparatus for producing a biodegradable resin foam according to the present invention.

The apparatus of the illustrated embodiment may be modified in such a manner that the chamber acting as the pressure adjusting chamber may have an evacuation valve connected thereto, as shown in FIG. 22. More particularly, an apparatus of FIG. 22 includes an evacuation pipe $L_2$ connected between a pressure reducing valve $V_1$ of a pressure reducing pipe $L_1$ connected to a chamber 5 or pressure adjusting chamber 5 and the chamber 5. The evacuation pipe $L_2$ is provided in the middle thereof with an evacuation valve $V_2$ and the evacuation pipe $L_2$ is exposed at an outlet thereof to an atmospheric pressure. The remaining part of the apparatus of FIG. 22 may be constructed in substantially the same manner as the apparatus of FIG. 21.

Figure 23:
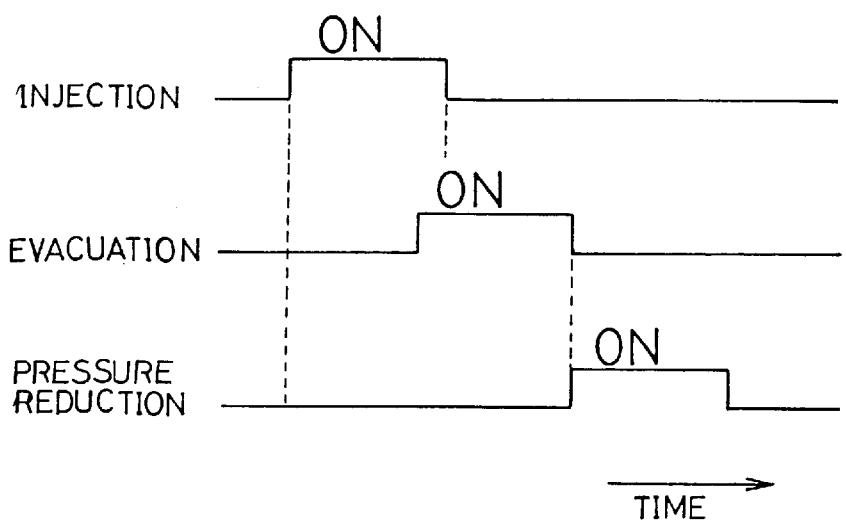
FIG. 23 is a timing chart showing a timing of each of injection, evacuation and pressure reduction in operation of the apparatus of FIG. 22.

When the evacuation valve $V_2$, as shown in FIG. 23, is rendered open in the course of injection of biodegradable resin into a forming mold A by means of an injection machine S to expose an interior of the chamber 5 to an atmospheric pressure. After the injection, the evacuation valve $V_2$ is closed and the pressure reducing valve $V_1$ is open to permit the pressure reducing tank $T_1$ to communicate with the chamber 5, resulting in a pressure in the chamber being rapidly reduced. A timing at which the evacuation valve $V_2$ is rendered open may be set between starting of the injection and termination thereof, therefore, the timing is not limited to any specific setting. It is determined depending on various factors such as a configuration of the forming mold A, a size of the chamber 5, a degree to which the cylinder 1 is pressurized during injection of the biodegradable resin, and the like.

In the modification of FIG. 22, the evacuation pipe $L_2$ is open at the outlet thereof to an atmospheric pressure, however, the modification is not limited to such construction. For example, the evacuation may be forcibly carried out under a reduced pressure formed by means of the pressure reducing pump $P_1$ or the like. In the apparatus shown in FIG. 21, resistance to the injection may be reduced by delaying a timing at which access between the fixed mold part 3 and the movable mold part 4 is carried out in a state that air is somewhat accessible to the mold by means of an actuation mechanism 44 of the mold clamp mechanism 40, tightly clamping the forming mold concurrently with termination of injection of the biodegradable resin into the forming mold, and then opening the pressure reducing valve $V_1$. Such construction requires control for carrying out association between actuation of the actuation mechanism 44 of the mold clamp mechanism 40 and operation of the pressure reducing valve $V_1$, as well as a controller therefor. This may be applied to additional embodiments of the present invention described hereinafter which is operated under pressure and is not provided with the evacuation valve $V_2$.

Figure 24:
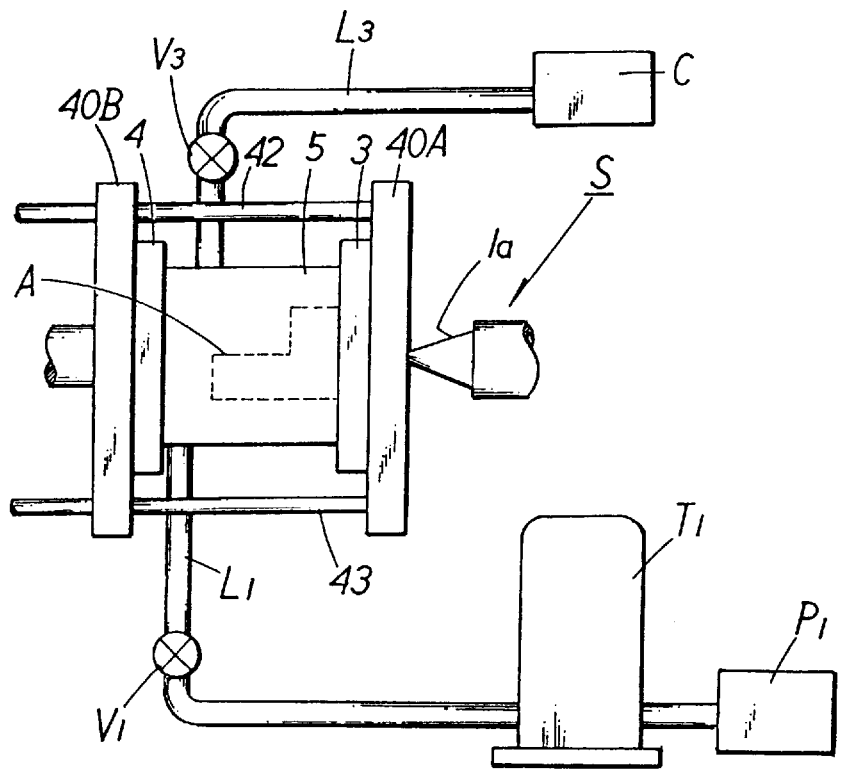
FIG. 24 is a side elevation view showing an essential part of a further embodiment of an apparatus for producing a biodegradable resin foam according to the present invention.
Figure 25:
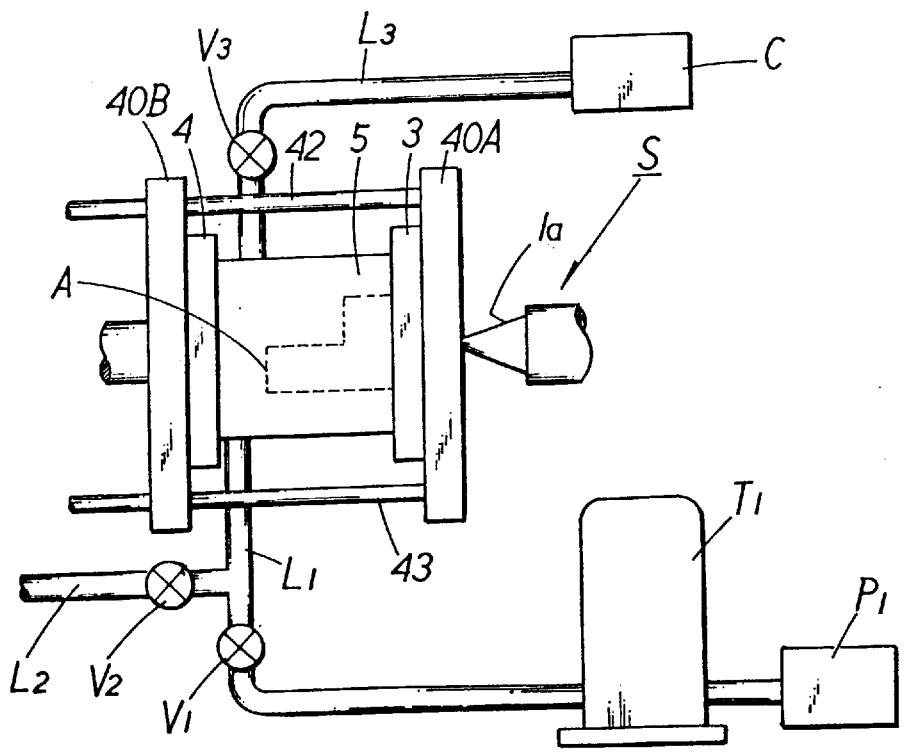
FIG. 25 is a side elevation view showing an essential part of still another embodiment of an apparatus for producing a biodegradable resin foam according to the present invention.

FIGS. 24 and 25 each show another embodiment of an apparatus of the present invention, which is generally constructed in such a manner that a chamber has a compressor connected thereto. More particularly, in the embodiment of FIG. 24, a chamber 5 acting as a pressure adjusting chamber has a pressurizing pipe $L_3$ connected thereto, which is provided in the middle thereof with a pressuring valve $V_3$ and connected through the pressuring valve $V_3$ to a compressor C. The pressurizing valve $V_3$ is open at the time when or before injection of biodegradable resin into a forming mold A by means of an injection machine S is started, to thereby pressurize the chamber 5 through the compressor C. After the injection, the pressurizing valve $V_3$ is closed to interrupt pressurization of the chamber 5 through actuation of the compressor C and a pressure reducing valve $V_1$ is open to permit a pressure reducing tank $T_1$ to communicate with the chamber 5 to rapidly reduce a pressure in the chamber. The remaining part of the embodiment of FIG. 24 may be constructed in substantially the same manner as the apparatus shown in FIG. 21.

Pressurization of the chamber 5 is carried out to obtain a pressure higher than a saturated water vapor pressure at a temperature at which the biodegradable resin is injected through a narrowed opening 1a into a forming mold A. For example, the pressure may be about 10 kg/cm² when the injection takes place at 170° C. When the chamber 5 has the compressor C rather than a pressuring tank $T_3$ connected thereto through the pressurizing valve $V_3$ as described hereinafter, the pressurizing valve $V_3$ may be kept open without being controlled or the pressurizing valve $V_3$ may be eliminated.

Figure 26:
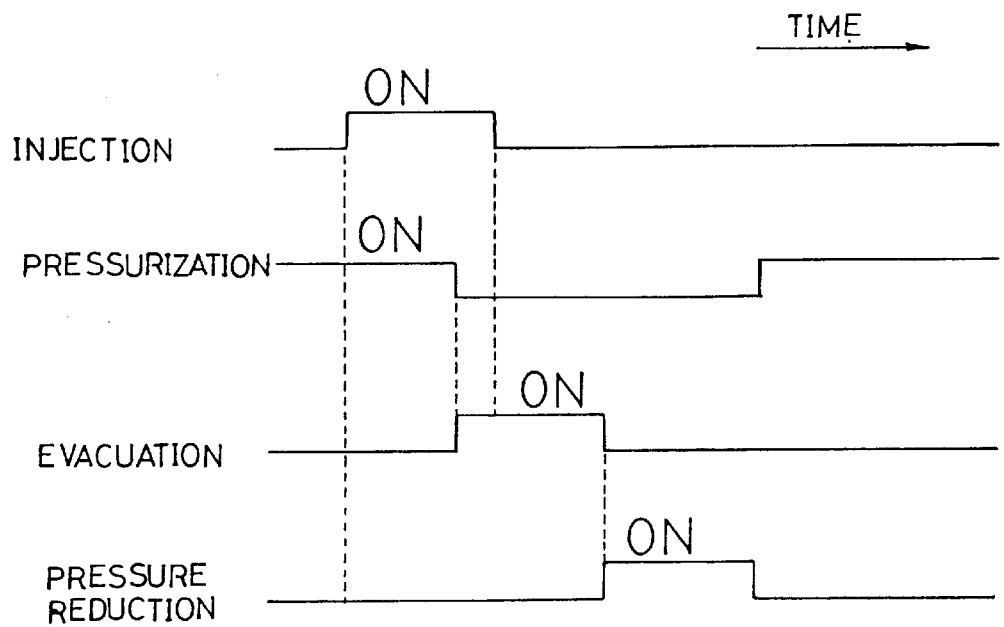
FIG. 26 is a timing chart showing a timing of each of injection, evacuation and pressure reduction in operation of the apparatus of FIG. 25.

In the embodiment of FIG. 25, a chamber 5 acting as a pressure adjusting chamber has a pressurizing pipe $L_3$ connected thereto, which is provided in the middle thereof with a pressuring valve $V_3$ and connected through the pressuring valve $V_3$ to a compressor C. The pressurizing valve $V_3$, as shown in FIG. 26, is rendered open at the time when injection of biodegradable resin into a forming mold A by means of an injection machine S is started, to thereby pressurize the chamber 5 through the compressor C. In the course of the injection, the pressurizing valve $V_3$ is closed to interrupt pressurization of the chamber 5 through the compressor C and an evacuation valve $V_2$ is open, resulting in the chamber 5 being exposed to an atmospheric pressure. After the injection, the evacuation valve $V_2$ is closed and a pressure reducing valve $V_1$ is open to permit a pressure reducing tank $T_1$ to communicate with the chamber 5 to rapidly reduce a pressure in the chamber 5. The remaining part of the embodiment of FIG. 25 may be constructed in substantially the same manner as the apparatus shown in FIG. 22.

Figure 27:
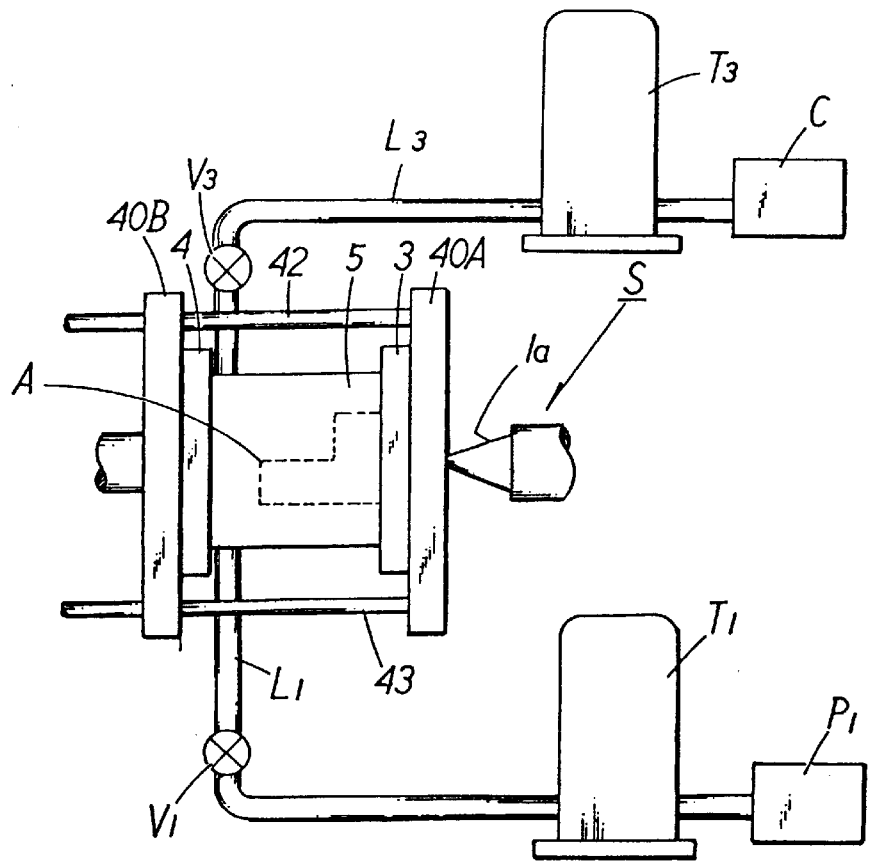
FIG. 27 is a side elevation view showing an essential part of yet another embodiment of an apparatus for producing a biodegradable resin foam according to the present invention.
Figure 28:
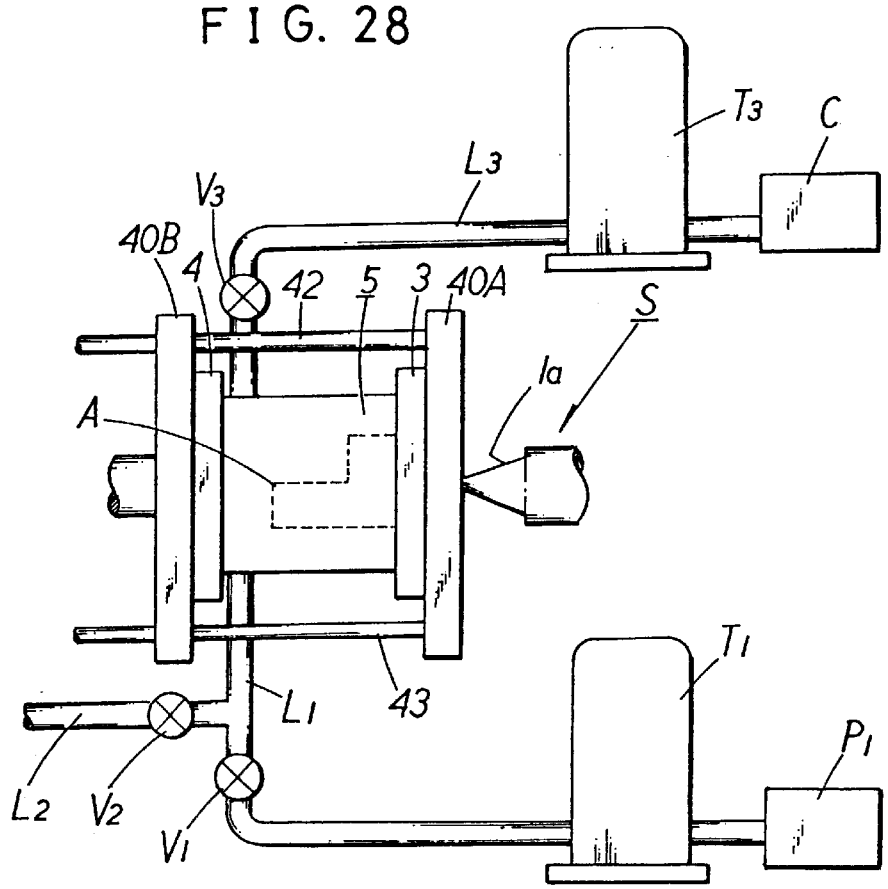
FIG. 28 is a side elevation view showing an essential part of even another embodiment of an apparatus for producing a biodegradable resin foam according to the present invention.

In addition, the apparatus of FIG. 21 may be constructed as in an embodiment shown in each of FIGS. 27 and 28, wherein a pressure adjusting chamber has a pressurizing tank connected thereto. More particularly, in the embodiment of FIG. 27, a chamber 5 functioning as a pressure adjusting chamber has a pressurizing pipe $L_3$ connected thereto, which is provided in the middle thereof with a pressurizing valve $V_3$ and connected via the pressuring valve $V_3$ to a pressuring tank $T_3$, which is then connected to a compressor C. The pressuring valve $V_3$ is kept open at the time when or before injection of biodegradable resin into a forming mold A by means of an injection machine S is started to permit the pressurizing tank $T_3$ to communicate with the chamber 5, to thereby rapidly pressurize the chamber 5. After the injection, the pressurizing valve $V_3$ is closed to interrupt communication between the tank $T_3$ and the chamber 5 and a pressure reducing valve $V_1$ is rendered open to carry out communication between a pressure reducing tank $T_1$ and the chamber 5 to rapidly reduce a pressure in the chamber 5. The remaining part of the apparatus of FIG. 27 may be constructed in substantially the same manner as the apparatus of FIG. 21.

In the embodiment of FIG. 28, a chamber 5 functioning as a pressure adjusting chamber has a pressurizing pipe $L_3$ connected thereto, which is provided in the middle thereof with a pressurizing valve $V_3$ and connected through the pressuring valve $V_3$ to a pressuring tank $T_3$, which is then connected to a compressor C. The pressurizing tank $T_3$ is permitted to communicate with the chamber 5 at the time when or before injection of biodegradable resin into a forming mold A by means of an injection machine S is started, to thereby rapidly pressurize the chamber 5. In the course of the injection, the pressurizing valve $V_3$ is closed to interrupt communication between the tank $T_3$ and the chamber 5 and an evacuation valve $V_2$ is rendered open to expose the chamber 5 to an atmospheric pressure. After the injection, the evacuation valve $V_2$ is closed and a pressure reducing valve $V_1$ is rendered open, to thereby carry out communication between a pressure reducing tank $T_1$ and the chamber 5, resulting in rapidly reducing a pressure in the chamber 5. The remaining part of the apparatus of FIG. 28 may be constructed in substantially the same manner as the apparatus of FIG. 22

Figure 29:
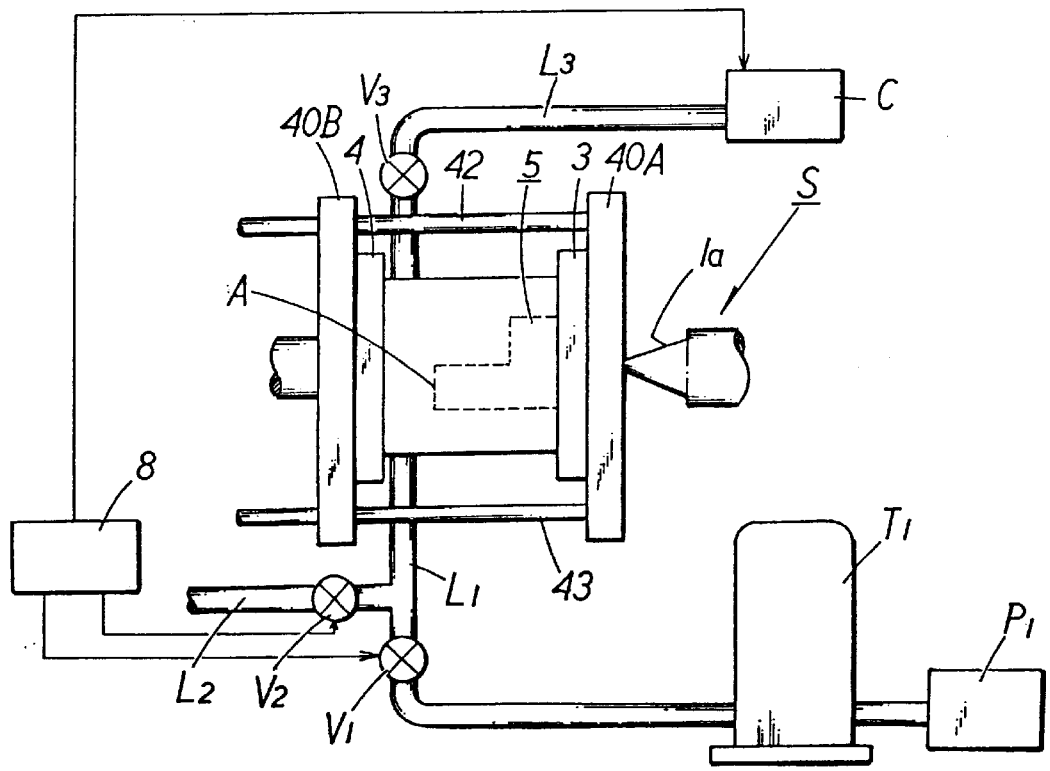
FIG. 29 is a side elevation view showing an essential part of a still further embodiment of an apparatus for producing a biodegradable resin foam according to the present invention.

Referring now to FIG. 29, a further embodiment of an apparatus of the present invention is illustrated. An apparatus of the illustrated embodiment includes a chamber 5 which serves as a pressure adjusting chamber and in which an air-permeable forming mold A is arranged. The chamber 5 has a pressure reducing pipe $L_1$ and a pressurizing pipe $L_3$ connected thereto. The pressure reducing pipe $L_1$ is connected thereto a pressure reducing tank $T_1$ for rapid pressure reduction and the pressurizing pipe $L_3$ is connected thereto a compressor C. The pressure reducing pipe $L_1$ is provided in the middle thereof with a pressure reducing valve $V_1$. An evacuation pipe $L_2$ is connected to a portion of the pressure reducing pipe $L_1$ between the pressure reducing valve $V_1$ and the chamber 5 and provided in the middle thereof with an evacuation valve $V_2$. The evacuation pipe $L_2$ is open on an outlet side thereof to an ambient atmosphere. Actuation of the compressor C for pressurization and operation of each of the evacuation valve $V_2$ and pressure reducing valve $V_1$ are controlled by a valve controller 8. Reference character S designates an injection machine for injecting, into a forming mold A, fluidized biodegradable resin in a heated and pressurized state in which moisture is trapped.

The pressurizing pipe $L_3$ is provided in the course thereof with a pressuring valve $V_3$, which is operated in association with ON-OFF operation of the compressor C. Alternatively, operation of the pressurizing valve $V_3$ may be carried out directly through the valve controller 8, so that the pressurizing valve $V_3$ may be eliminated. Also, the pressurizing valve $V_3$ may be left open without being controlled.

In general, a valve has a directional property in a passage thereof. Therefore, when the chamber 5 is concurrently provided with the pressuring valve $V_3$ and the pressure reducing valve $V_1$ or evacuation valve $V_2$ as shown in FIG. 29, a valve free of any directional property is required to be used as each of the valves $V_1$ to $V_3$. Alternatively, it is required that arrangement of the valves is carried out not to adversely affect the pressurization and pressure reduction.

The valve controller 8 comprises a timer operated on the basis of, for example, the time when injection of biodegradable resin into the forming mold A is started and is adapted to control operation of each of the valves according to a timing chart shown in FIG. 26. For example, when a start button is turned on to start injection of the biodegradable resin into the forming mold A by means of the injection machine S, the pressurizing valve $V_3$ previously kept open is further kept open for a predetermined period of time set by the timer, during which the pressuring valve $V_3$ is rendered open and the compressor C kept turned on causes a pressure in the chamber 5 to be increased. This results in the biodegradable resin injected into the forming mold A being maintained pressurized through pores of the air-permeable forming mold A, so that moisture is positively trapped in the biodegradable resin.

Then, the pressurizing valve $V_3$ is closed before completion of the injection and concurrently the compressor C is turned off, resulting in actuation of the compressor for pressurization being interrupted, and the evacuation valve $V_2$ is kept open for a predetermined period of time. This causes the biodegradable resin being injected under pressure to be open to an ambient atmosphere in the course of the injection, leading to a reduction in injection resistance, so that the biodegradable resin may be spread throughout the forming model A. A timing at which the pressurizing valve $V_3$ is closed and concurrently the compressor C is turned off to open the evacuation valve $V_2$ is not necessarily definitely determined and is suitably adjusted depending on a configuration of the forming mold A, a volume of the chamber 5, a degree of the pressurization and evacuation, and the like.

After completion of the injection, the evacuation valve $V_2$ is closed and concurrently the pressure reducing valve $V_1$ is kept open for a predetermined period of time. Thus, after the injection, the pressure reducing tank $T_1$ is permitted to communicate with the chamber 5 to rapidly reduce a pressure in a forming space R of the forming mold A. This results in moisture trapped in the biodegradable resin being vaporized at a stretch to form a biodegradable resin foam. Then, the pressure reducing valve $V_1$ is closed after a predetermined period of time elapses.

The remaining part of the illustrated embodiment may be constructed in substantially the same manner as the apparatus described above with reference to FIG. 1.

Figure 30:
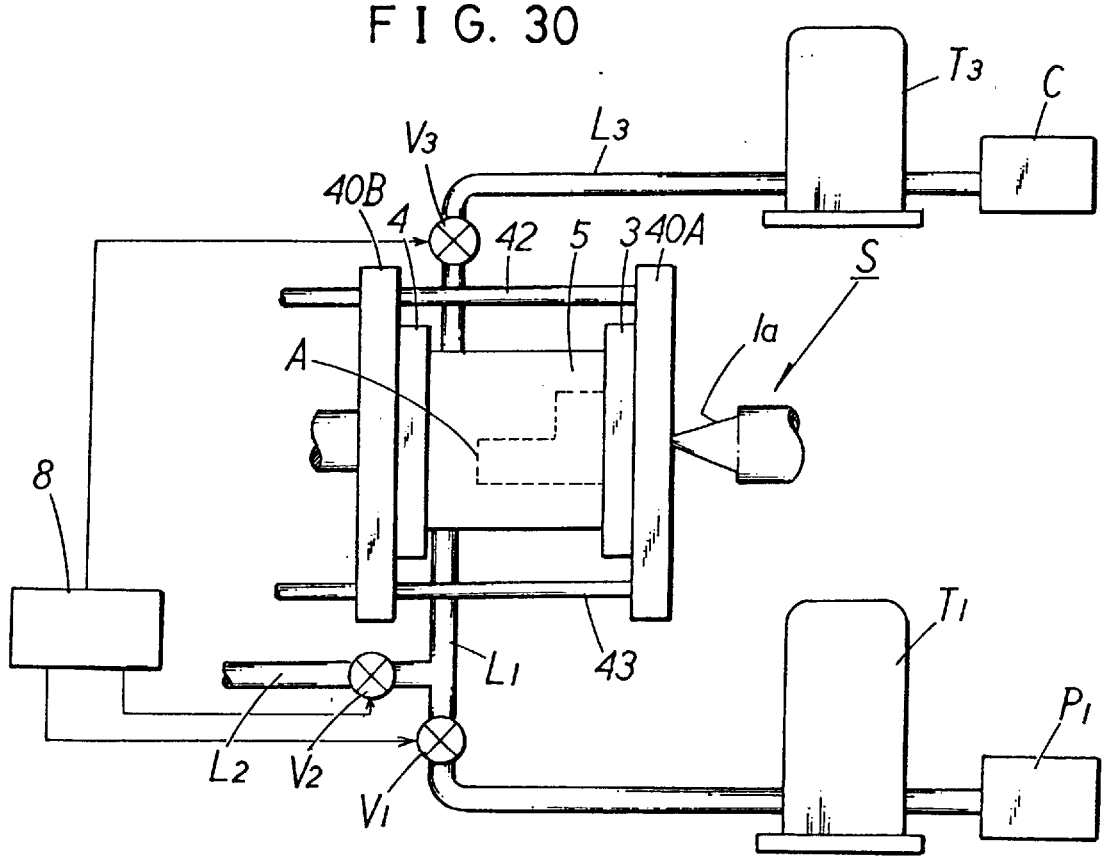
FIG. 30 is a side elevation view showing an essential part of a yet further embodiment of an apparatus for producing a biodegradable resin foam according to the present invention.

FIG. 30 shows still another embodiment of an apparatus of the present invention, which is constructed in substantially the same manner as the apparatus of FIG. 29 except that a pressuring tank $T_3$ is arranged between a pressurizing valve $V_3$ and a compressor C.

The embodiment shown in each of FIGS. 29 and 30 may be so constructed that the valve controller 8 controls so as to open the evacuation valve $V_2$ in the course of injection of the biodegradable resin into the forming mold A by means of the injection machine S, and close the evacuation valve $V_2$ and open the pressure reducing valve $V_1$ after the injection without arrangement of the compressor C, pressurizing tank $T_2$ and pressurizing valve $V_2$.

Also, the embodiment shown in each of FIGS. 29 and 30 may be so constructed that the valve controller 8 controls so as to open the pressuring valve $V_3$ at the time when or before injection of the biodegradable resin into the forming model A by means of the injection machine S is started, and close the pressuring valve $V_3$ and open the pressure reducing valve $V_1$ after the injection.

Figure 31:
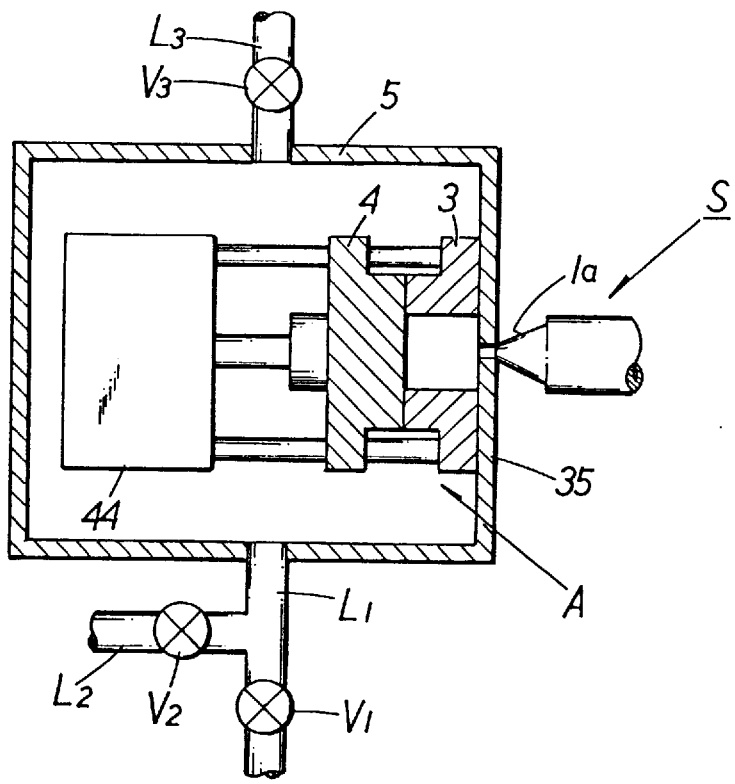
FIG. 31 is a vertical sectional side elevation view showing an essential part of a yet further embodiment of an apparatus for producing a biodegradable resin foam according to the present invention.

FIG. 31 shows yet another embodiment of an apparatus of the present invention, wherein a chamber 5 is arranged so as to surround both a forming mold A and a mold clamp mechanism 40. The chamber 5 has a side plate 35 arranged so as to face an injection machine S, which side plate may be used as a mold plate.

Figure 32:
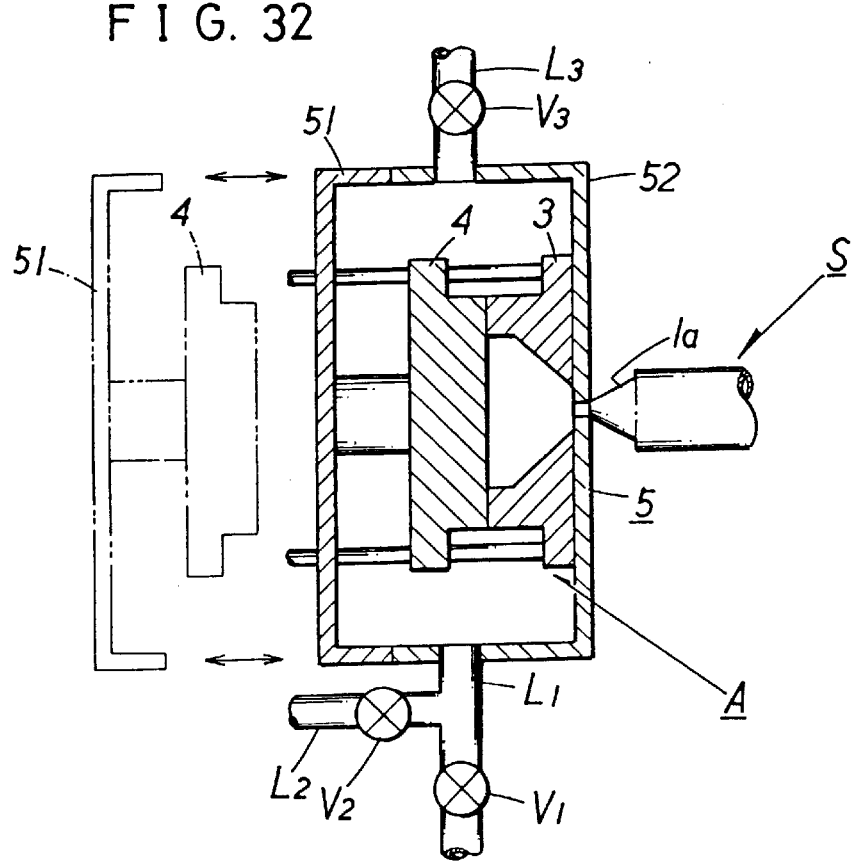
FIG. 32 is a vertical sectional side elevation view showing an essential part of an even further embodiment of an apparatus for producing a biodegradable resin foam according to the present invention.

FIG. 32 shows even another embodiment of an apparatus of the present invention, wherein a chamber 5 is arranged so as to surround a forming mold A and divided into a movable-side part 51 and a fixed-side part 52, resulting in the movable-side part 51 being movable integrally with a movable mold part 4 as indicated by phantom lines. Such construction permits a biodegradable resin foam to be readily removed due to concurrent operation of the forming mold A and chamber 5 when the resin foam is complicated in configuration.

Figure 33:
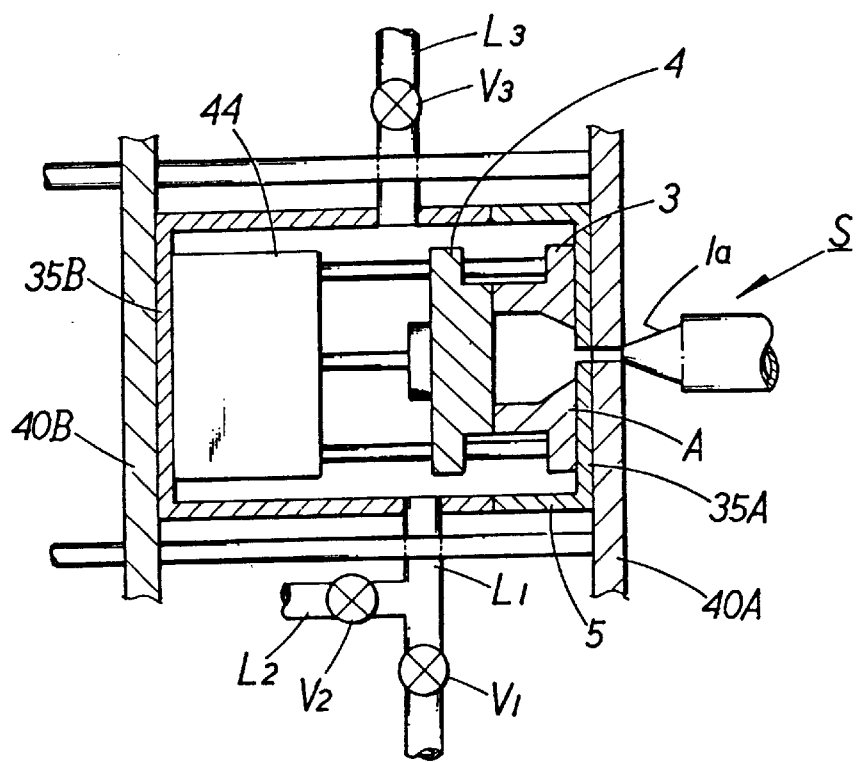
FIG. 33 is a vertical sectional side elevation view showing an essential part of an additional embodiment of an apparatus for producing a biodegradable resin foam according to the present invention.

FIG. 33 shows a still further embodiment of an apparatus of the present invention, wherein a chamber 5 is arranged so as to surround a forming mold A and fixedly mounted through a side plate 35A thereof on a fixed-side mold plate 40A and through a side plate 35B thereof opposite to the side plate 35A on a movable-side mold plate 40B, resulting in providing a dual-type mold clamp mechanism. The remaining part of each of the embodiments of FIGS. 31 to 33 may be constructed in substantially the same manner as the apparatus of FIG. 29.

In each of the embodiments described above, the chamber 5 may be provided with a pressure gauge for suitably detecting whether a pressure in the chamber 5 is at an appropriate level. Also, the embodiments each may be so constructed that in order to prevent excessive pressurization of the chamber 5 during the pressurization, the chamber 5 is provided with a pressure sensor and a flow-rate varying valve is used as the pressuring valve $V_3$, to thereby to control a flow rate through the valve $V_3$ when the pressure sensor detects that a pressure in the chamber 5 exceeds a predetermined level.

Also, in each of the embodiments, a plurality of the pressure reducing tanks $T_1$ and pressuring tank $T_3$ may be arranged so as to be successively alternately used for the purpose of permitting the apparatus of the present invention to produce the biodegradable resin foam B while exhibiting improved productivity. More particularly, communication of the pressure reducing tank $T_1$ and/or pressuring tank $T_3$ with the chamber 5 causes a pressure in the chamber 5 to be varied, so that production of the next biodegradable resin foam B requires to return the pressure to its original level.

However, the pressure reducing pump $P_1$ and compressor cause a period of time during which the pressure is returned to the original state to be increased, leading to an increase in waiting period. The above-described alternate use of a plurality of the pressure reducing tanks $T_1$ and/or pressurizing tanks $T_3$ permits one of the tanks to be returned to the original state during operation of another tank, to thereby eliminate the waiting period, so that production of the biodegradable resin foam may be carried out rapidly and in a repeated manner.

In production of the biodegradable resin foam B, the biodegradable resin may consist of a first biodegradable resin ingredient of 100° C. or more in melting point and a second biodegradable resin ingredient having a melting point of 100° C. or less. The first biodegradable resin ingredient may comprise polycaprolactone or a material containing it. The biodegradable resin may have polyhydric alcohols and derivatives thereof added thereto.

The method and apparatus of the present invention may be constructed so as to permit pressure reduction in the forming space R to be instantaneously accomplished and the pressure reduction to be carried out in a large scale or volume, resulting in improving quality of the biodegradable resin foam B.

Figure 34:
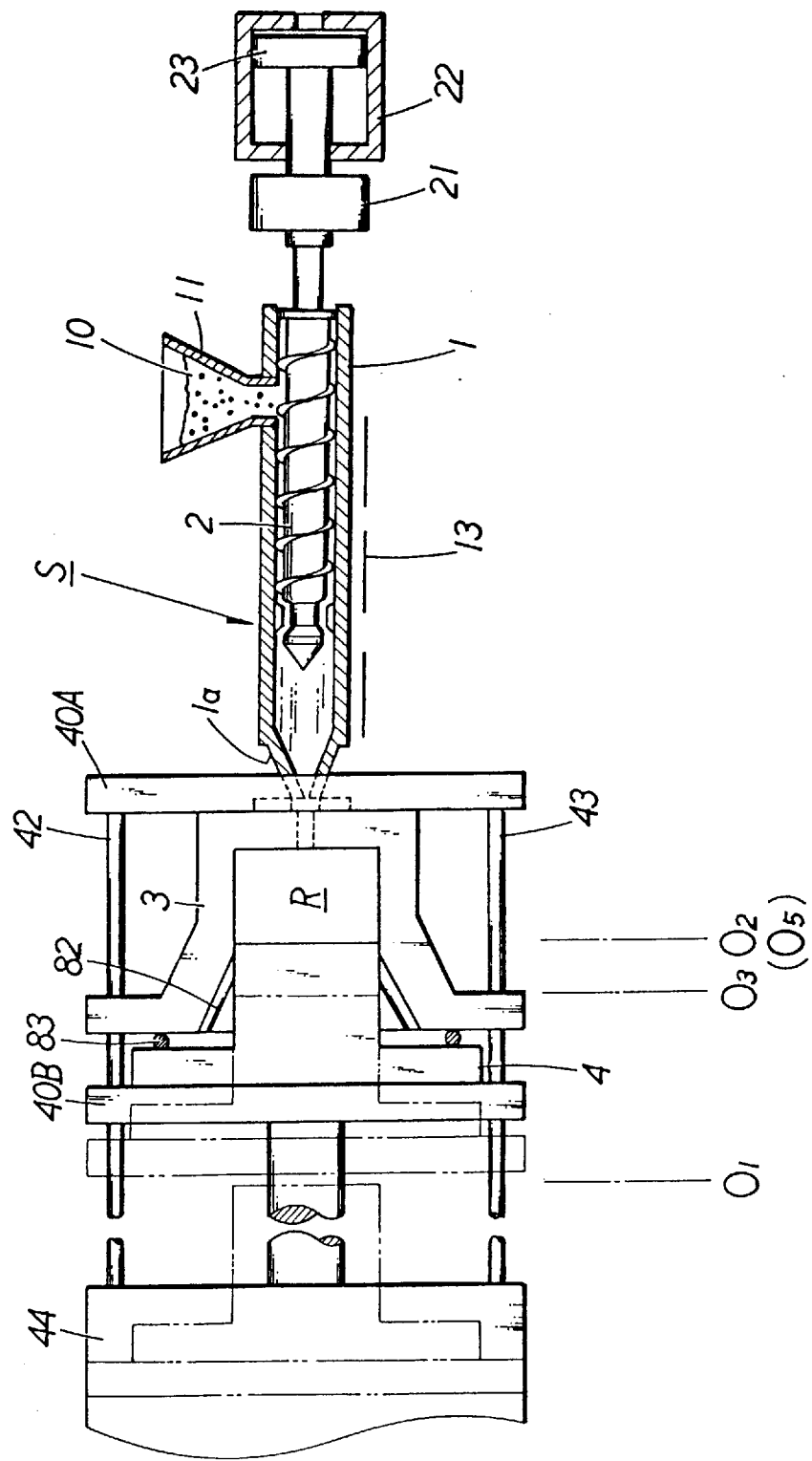
FIGS. 34 to 36 each are a vertical sectional side elevation view showing another embodiment of an apparatus for producing a biodegradable resin foam according to the present invention which is constructed so as to permit a pressure in an atmosphere in a space of a forming mold to be reduced and permits such pressure reduction to be accomplished in a large scale.

FIG. 34 shows an additional embodiment of an apparatus of the present invention which is constructed so as to accomplish such an object. More particularly, an apparatus of the illustrated embodiment includes a forming mold A arranged forward of an injection machine S. The forming mold A includes a fixed mold part 3 formed with a cavity 31 communicating with a narrowed opening 1a and a movable mold part 4 formed with a core 41. The fixed mold part 3 and movable mold part 4 are mounted on a fixed-side mold plate 40A of a mold operating mechanism for the forming mold A and a movable-side mold plate 40B thereof, respectively. The cavity 31 is formed- into, for example, a rectangular shape and cooperates with the core 41 to define a forming space R in the forming mold A. The fixed mold part 3 is provided with an inlet port 81, communication holes 82 for releasing airtightness of the forming space R and an O-ring 83 for holding airtightness.

The forming space R of the forming mold A is tightly closed when the fixed mold part 3 and movable mold part 4 are clamped together by means of the mold operating mechanism of the forming mold A. The mold operating mechanism permits the movable mold part 4 to take a released position $0_1$, an airtightly closed position $0_2$, an airtightness released position $0_3$ and the released position $0_1$ in turn. The mold operating mechanism includes tie bars 42 and 43 for guiding the fixed-side mold plate 40A and movable-side mold plate 40B so as to permit the fixed mold part 3 and movable mold part 4 to access to each other while being opposite to each other and an actuation mechanism 44 for accessibly actuating the movable mold part 4.

Now, production of a biodegradable resin foam by means of the apparatus of FIG. 34 constructed as described above will be describe hereinafter.

First, the forming mold A is clamped by means of the mold operating mechanism to close the forming space R while keeping a pressure in the space R at a level of, for example, an atmospheric pressure. Then, a hopper 11 is fed with particles 10 formed of moisture and biodegradable resin. The particles 10 are then forwardly forcibly transferred in a cylinder 1 by means of a screw 2, during which the particles 10 are heated to a temperature near a softening point of the particles 10 or a melting point thereof by shearing force due to rotation of the screw 2 and heat applied thereto through the cylinder 1 from a heater 13, resulting in being collected in an inner space of the cylinder 1 defined on a side of a distal end of the screw in the cylinder 1 while being fluidized. The inner space of the cylinder 1 is under heated and pressurized conditions, so that moisture contained in the particles 10 is kept forcibly trapped in therein without evaporating therefrom.

Then, rotation of the screw 2 is stopped and a piston 23 in an injection cylinder 22 is driven to advance the screw 2, so that the fluidized biodegradable resin may be injected at a stretch from the cylinder 1 through the narrowed opening 1a and inlet port 81 into the forming space R. After the injection, the movable mold part 4 of the forming mold A is moved to the airtightness released position $0_3$ through the mold operating mechanism, so that the forming space R is rapidly reduced in pressure to a level of an atmospheric pressure through the communication holes 82, so that moisture trapped in the fluidized biodegradable resin is instantaneously vaporized to foam the resin and then outwardly discharged in the from of water vapor through the communication holes 82. At this time, expansion force due to formation of the water vapor is exerted in the foamed biodegradable resin, however, an outermost portion of the foamed resin is regulated by the forming space R defined by the cavity 31 and core 41, so that a biodegradable resin foam of a predetermined configuration may be produced.

Then, the screw 2 is retracted while being rotated, during which the next biodegradable resin fluidized is collected in the inner space of the cylinder defined on the side of the distal end of the screw 2 for the next operation. During the period, the biodegradable resin foam formed in the forming space R is allowed to be cooled and solidified, thus, actuation of the mold operating mechanism permits the movable mold part 4 to be moved to the released position $0_1$ for removal of the resin foam B and then returned to the airtightly closed position $0_2$ for the next operation.

Figure 35:
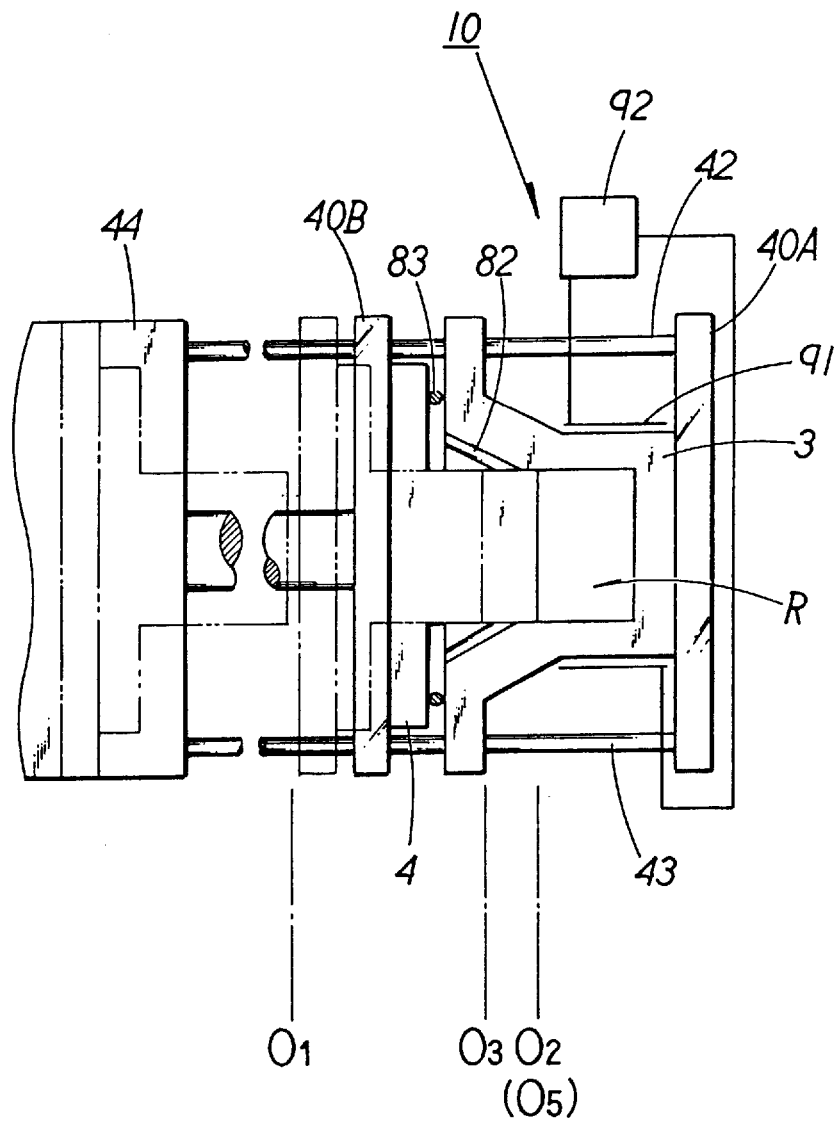

FIG. 35 shows a yet further embodiment of an apparatus of the present invention, which is constructed in substantially the same manner as the apparatus shown in FIG. 34, except that an injection machine S is eliminated and a heating means 9 is provided for heating a forming mold A. The heating means 9 comprises, for example, a heater 91 arranged outside a fixed mold part 3. Reference numeral 92 designates a power supply for heating.

Now, production of a biodegradable resin foam by means of the apparatus shown in each of FIGS. 34 and 35.

First, the movable mold part 4 of the forming mold A is moved to the released position $0_1$ by means of the mold operating mechanism. Then, the biodegradable resin is placed in the forming space R defined by the cavity 31 and core 41 and then actuation of the mold operating mechanism causes the movable mold part 4 to be moved to the airtightly closed position $0_2$ to keep the forming space R airtight. Under such conditions, the forming mold A is heated by the heating means 9 to cause the biodegradable resin to be fluidized. The forming space R is in a heated and pressurized state, to thereby prevent moisture contained in the biodegradable resin from being vaporized, resulting in being forcibly trapped in the resin. Then, the movable mold part is moved to the airtightness released position $0_3$ through the mold operating mechanism to reduce a pressure in the forming space R to a level of an atmospheric pressure through the communication holes 82, so that moisture trapped in the biodegradable resin may be instantaneously vaporized to foam the resin by expansion force due to vaporization of moisture and the resultant water vapor is outwardly discharged from the forming space R through the communication holes 82, resulting in a biodegradable resin foam of a desired configuration being produced in the forming space R. The resin foam is allowed to be cooled and solidified and then the movable mold part 4 is moved to the released position $0_1$ through actuation of the mold operating mechanism, followed by removal of the resin foam therefrom. The above-described procedure is repeated for the next operation.

Figure 36:
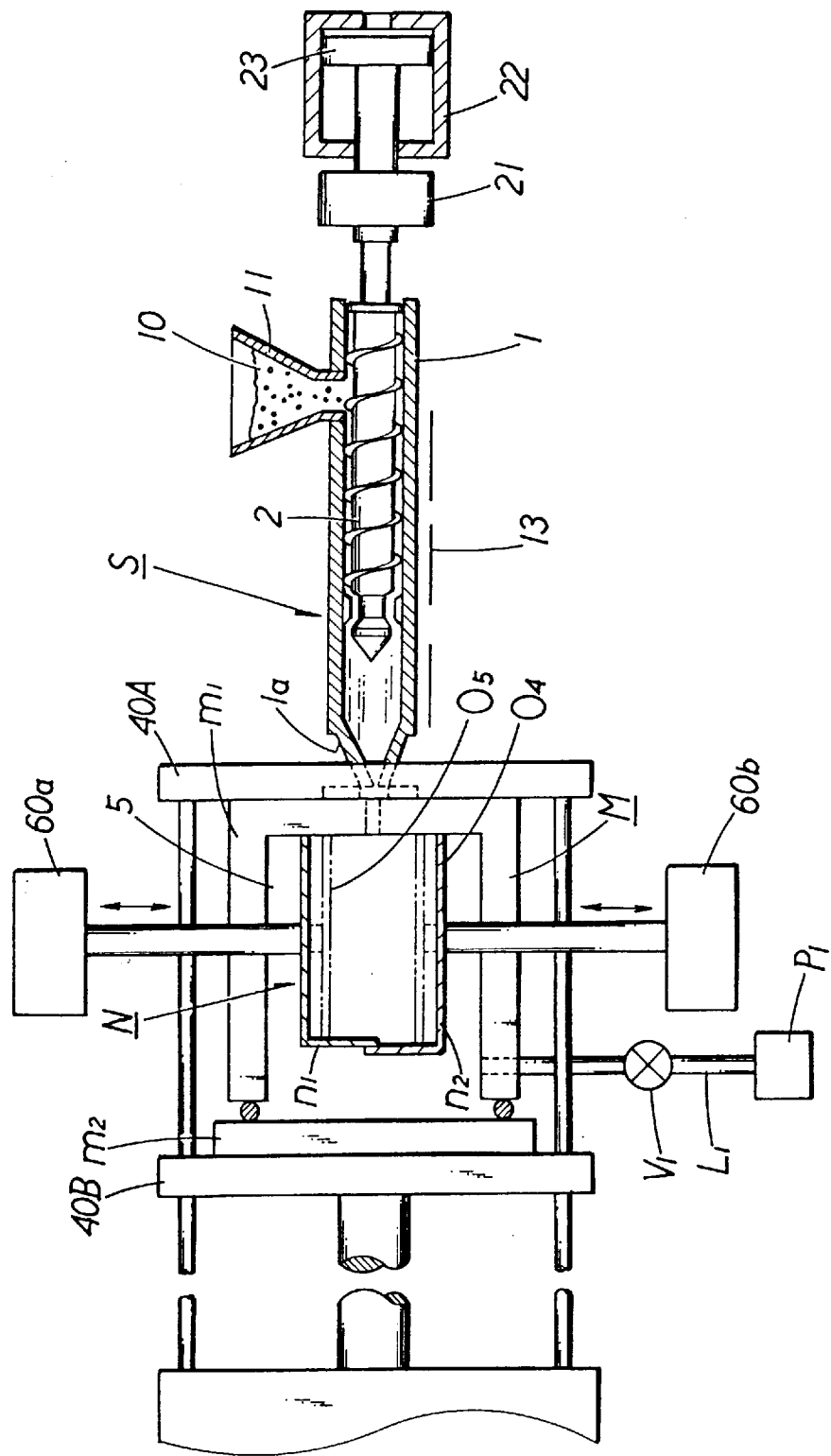

Referring now to FIG. 36, even another embodiment of an apparatus of the present invention is illustrated. In FIG. 36, reference numeral 5 designates a chamber, which is constituted by a mold M of a so-called injection molding machine and includes a fixed mold part $m_1$ formed with a cavity communicating with a narrowed opening 1a and a movable mold part $m_2$. The fixed mold part $m_1$ and movable mold part $m_2$ are mounted on a fixed-side mold plate 40A of a mold clamp mechanism and a movable-side mold plate 40B thereof, respectively. The cavity is formed into a rectangular shape and more particularly a rectangular parallelepiped shape, resulting in forming an inner chamber in the chamber 5, in which an air-permeable press die N corresponding to the forming mold M is arranged.

The air-permeable press die N is formed with a plurality of pores which permit water vapor to pass through as in the forming mold A described above and may be made of a sintered metal material such as foamed metal sintered and formed, a sintered ceramic material such as ceramic sintered to which a void forming filler is added, or the like. Alternatively, it may be formed of a wire mesh, a punched metal plate formed with a number of holes or the like. The press die N is divided into an upper die part $n_1$ and a lower die part $n_2$, which are adapted to be movable between a foaming position $0_4$ and a pressing position $0_6$ through access mechanisms 60a and 60b, respectively.

The chamber 5 is tightly closed when the fixed mold part M and movable mold part $m_2$ of the mold M are clamped together through the mold clamp mechanism. The chamber and mold clamp mechanism may be arranged while being exposed to an atmospheric pressure. The chamber 5 has a pressure reducing pipe $L_1$ connected thereto, which is provided in the middle thereof with a pressure reducing valve $V_1$ and connected to a pressure reducing pump $P_1$ through the pressure reducing valve $V_1$. A pressure reducing tank may be connected between the pressure reducing valve $V_1$ and the pressure reducing pump $P_1$ as required.

Now, production of a biodegradable resin foam by means of the apparatus shown in FIG. 36 will be described hereinafter.

First, the pressure reducing valve $V_1$ is closed to render the chamber 5 airtight and the upper and lower die parts $n_1$ and $n_2$ of the press die N are positioned at the foaming position $0_4$. Then, biodegradable resin fluidized or melted is injected through the narrowed opening 1a into the press die N. Then, the pressure reducing valve $V_1$ is open to reduce a pressure in the chamber 5, so that moisture trapped in the resin is instantaneously evaporated or vaporized to foam the resin and the resultant water vapor is outwardly discharged through the pores of the press die N and pressure reducing valve $V_1$. At this time, expansion force due to vaporization of the water vapor is exerted in the biodegradable resin, however, an outermost portion of the resin is kept contacted with an inner surface of the press die N, so that a foamed portion of the resin is regulated by a configuration of the press die N at the foaming position $0_4$. After the foaming, the upper and lower die parts $n_1$ and $n_2$ of the press die N are rapidly moved to the pressing position $0_5$ by means of the access mechanisms 60a and 60b, respectively, resulting in the forming space R being reduced in volume, so that: the foamed resin may be compressed as compared with the initial foamed state. Thus, any cavity and/or void occurring in the foamed resin in the initial foaming stage are extinguished due to the compression, thus, a biodegradable resin foam exhibiting satisfactory quality is provided. Reduction of the forming space R after the foaming should be carried out under the condition that moisture still remains in the forming space R; because cells of the foamed resin are hard to adhere to each other when cooling and solidification of the foamed resin are substantially advanced, resulting in the space R being substantially free of water vapor.

The above-described construction of the apparatus of FIG. 36 may be incorporated in the apparatus of each of FIGS. 34 and 35. The apparatus of FIG. 34 may be constructed so as to move the movable mold part 4 of the forming mold A in an order of the released position $0_1$, the airtightly closed position $0_2$, the airtightness released position $0_3$, the pressing position and the released position $0_1$ rather than in an order of the released position $0_1$ the airtightly closed position $0_2$, the airtightness released position $0_2$ and the released position $0_1$. In the illustrated embodiments, the airtightly closed position $0_2$ and pressing position $0_5$ are substantially the same.

Thus, after the forming, the movable mold part 4 of the forming mold A is rapidly moved to the pressing position $0_5$ by means of the mold operating mechanism to reduce a volume of the forming space R. so that the biodegradable resin foam is formed while being kept compressed as compared with a volume thereof obtained in the initial foaming stage. This permits any cavity and/or void occurring in the initial foaming stage to be effectively extinguished, to thereby provide the biodegradable resin foam with improved quality. Also, the forming space R is rendered open through the communication holes 82 to a pressure reduced atmosphere such as, for example, an ambient atmosphere after the movable mold part 4 is moved to the airtightness released position $0_3$, so that it may be instantaneously reduced in pressure in bulk, to thereby prevent softening and collapsing of the resin foam due to re-adhesion of moisture thereto, resulting in ensuring satisfactory quality of the resin foam.

Also, the illustrated embodiment may be so constructed that the movable mold part 4 of the forming mold A takes the airtightness released position $0_3$, pressing position $0_5$ and released position $0_1$ and is moved to the released position $0_1$, airtightness released position $0_3$, pressing position $0_5$ and released position $0_1$ in order. Such construction permits the fluidized and water-trapped biodegradable resin in a heated and pressurized state to be injected into the forming mold A through the inlet port 81 by means of the injection machine S at the airtightness released position $0_3$ to which the movable mold part 4 has been moved by means of the mold operating mechanism. At this time, the forming space R is permitted to communicate with an ambient atmosphere through the communication holes 82, resulting in being released from pressure, so that expansion force due to vaporization of moisture contained in the resin leads to formation of the biodegradable resin foam. Immediately after the foaming, actuation of the mold operating mechanism permits the movable mold part 4 to be rapidly moved to the pressing position $0_5$ to reduce a volume of the forming space R, so that formation of the biodegradable resin foam may be carried out while keeping the product compressed. Thus, it will be noted that such injection of the biodegradable resin into the forming space R at the airtightness released position $0_3$ exhibits the same function and advantage as described above.

The above-described construction of the illustrated embodiment may be incorporated in the apparatus shown in FIG. 35. Thus, movement of the movable mold part 4 of the forming mold A to the pressing position $0_5$ by means of the mold operating mechanism upon the foaming causes a decrease in volume of the forming space R, resulting in the biodegradable resin foam B being provided while compressed. After the foam product B is cooled, to thereby be solidified, the movable mold part 4 is moved to the released position $0_1$ by means of the mold operating mechanism, followed by removal of the resin foam B from the forming mold A. Such construction exhibits the same function and advantage as described above.

As can be seen from the foregoing, the biodegradable resin foam of the present invention comprises a combination of the main biodegradable resin ingredient or first biodegradable resin ingredient having a melting point of 100° C. or more and the low-melting biodegradable resin ingredient or second biodegradable resin ingredient having a melting point of 100° C. or less. Thus, in the resin foam, the second biodegradable resin ingredient is kept from being immediately solidified, to thereby function as an adhesive with respect to the first biodegradable resin ingredient. Thus, even when any cavity and/or void are generated in the foamed biodegradable resin, cells of the foamed resin are permitted to adhere to each other, resulting in the biodegradable resin foam being provided with satisfactory quality.

In particular, when the second biodegradable resin ingredient is selected from the group consisting of polycaprolactone and a material containing polycaprolactone, the function of the second biodegradable resin ingredient as an adhesive is significantly enhanced. Also, when the biodegradable resin has polyhydric alcohols and derivatives thereof added thereto, moisture in the biodegradable resin is increased in boiling point, resulting in functioning also as a plasticizer, so that cells of the foamed biodegradable resin are rendered dense and uniform.

In the method of the present invention, the biodegradable resin fluidized due to an increase in temperature thereof is rapidly released from a heated and pressurized environment in the cylinder and extruded into the air-permeable forming mold, to thereby be formed into a predetermined configuration. Thus, moisture contained in the biodegradable resin is increased in boiling point under pressure, resulting in being in the form of liquid in the cylinder, so that releasing of the resin from the heated and pressurized environment in the cylinder causes the moisture to be instantaneously vaporized, leading to foaming of the resin. The resultant water vapor is outwardly discharged through the air-permeable forming mold, to thereby be prevented from adhering to the formed resin foam.

The atmosphere in which the forming mold is placed may be kept decreased in pressure or ventilated after extrusion of the fluidized biodegradable resin into the mold is started or since a stage before the extrusion is started. This prevents moisture from remaining in the form of steam in the forming mold or being condensed on a surface of the biodegradable resin foam due to a decrease in temperature after vaporization and expansion of the moisture, resulting in the resin foam being provided with satisfactory uniformity.

In the method of the present invention, extrusion of the fluidized biodegradable resin into the mold may be carried out while placing the nozzle arranged with respect to the narrowed opening in the depths of the forming mold at the time when operation of the nozzle is started and retracting the nozzle relative to the forming mold during extrusion of the biodegradable resin. Such construction permits the biodegradable resin to be charged in the forming mold in order from the side of the depths of the mold, resulting in a different between a timing at which the resin is spread throughout the forming mold and a timing of foaming of the resin being minimized or substantially eliminated, to thereby substantially prevent cells of the foamed biodegradable resin from being collapsed.

In the method of the present invention, extrusion of the fluidized biodegradable resin into the forming mold may be carried out while keeping an atmosphere in the forming mold pressurized during the extrusion and a pressure in the atmosphere in the forming mold may be rapidly reduced after completion of the extrusion.

In the method of the present invention, extrusion of the fluidized biodegradable resin into the forming mold may be carried out by injecting the biodegradable resin into the forming mold while keeping the resin atomized. This permits not only the biodegradable resin to be spread throughout the forming mold but the atomized biodegradable resin to be effectively foamed, followed by integration of cells of the foamed resin substantially without being collapsed, to thereby provide the biodegradable resin foam with increased uniformity.

In the method of the present invention, the biodegradable resin starting material may comprise the biodegradable resin, moisture and water repellent material. The starting material of such composition ensures desired foaming of the biodegradable resin and permits it to be finely and uniformly foamed.

Also, the water repellent material may comprise a material which is not fully evaporated when the biodegradable resin is released from the heated and pressurized environment. Such a material includes a natural fatty acid polymer. Use of the polymer as the water repellent material permits it to cover cells of the foamed biodegradable resin to provide it with water repellent properties, to thereby prevent the cells from being collapsed due to contact with water.

In the method of the present invention, the step of forming the foamed biodegradable resin into a shape depending on a configuration of the forming mold may be carried out by forming the whole biodegradable resin into an integrated configuration. This permits the biodegradable resin foam to be formed into a relative large volume or any desired configuration.

The apparatus of the present invention is so constructed that the pressure adjusting chamber is constructed in an openable and sealable manner, the air-permeable forming mold is arranged in the pressure adjusting chamber, the pressure reducing tank is connected to the pressure adjusting chamber to rapidly reduce a pressure in the pressure adjusting chamber, and the injection machine is arranged injecting, into the forming mold, fluidized biodegradable resin placed in a heated and pressurized environment and having moisture trapped therein. Such construction of the apparatus permits the pressure reducing tank to communicate with the pressure adjusting chamber after injection of the resin into the forming mold, so that water vapor in the forming mold may be effectively outwardly discharged, to thereby eliminate retention of moisture in the forming mold. Thus, the apparatus of the present invention provides the biodegradable resin foam with a desired configuration and uniform quality.

In the apparatus of the present invention, the pressure adjusting chamber may have the evacuation valve connected thereto. Thus, when the pressure adjusting chamber is rendered open to an ambient atmosphere in the course of injection of the biodegradable resin, resistance to injection of the resin into the forming mold arranged in the chamber is reduced because the forming mold is air-permeable, so that the injection may be facilitated. Thus, the injection machine is prevented from being large-sized.

In the apparatus of the present invention, the pressure adjusting chamber may have a compressor connected thereto. Such construction permits injection of the biodegradable resin into the forming mold by means of the injection is carried out while keeping moisture positively trapped in the resin because actuation of the compressor causes the pressure adjusting chamber to be pressurized. Then, operation of the evacuation valve results in the pressure adjusting chamber being released from pressurization, leading to a decrease in injection resistance, so that the biodegradable resin may be spread throughout the forming mold.

In the apparatus of the present invention, the pressure adjusting chamber may have a pressurizing tank connected thereto. Thus, the pressure adjusting chamber is rapidly pressurized at an appropriate timing when the biodegradable resin is to be injected into the forming mold.

In the apparatus of the present invention, the valve controller may be arranged so as to control operation of the pressure reducing valve, operation of the evacuation valve and actuation of the compressor, so that the pressure adjusting chamber may be controlled to pressurization, evacuation or pressure reduction in association with a timing of injection of the biodegradable resin into the forming mold by means of the injection machine.

In the apparatus of the present invention, the valve controller may be arranged so as to control operation of the pressure reducing valve, operation of the evacuation valve and actuation of the pressurizing valve, so that the pressure adjusting chamber may be controlled to pressurization, evacuation or pressure reduction in association with a timing of the injection.

In the apparatus of the present invention, the valve controller may be arranged so as to control operation of each of the pressure reducing valve and evacuation valve, so that the pressure adjusting chamber may be controlled to evacuation or pressure reduction in association with a timing of the injection.

In the apparatus of the present invention, the valve controller may be arranged so as to control operation of each of the pressure reducing valve and pressurizing valve, so that the pressure adjusting chamber may be controlled to pressurization or pressure reduction in association with a timing of the injection.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An apparatus for producing a biodegradable resin foam, comprising:
   a pressure adjusting chamber constructed so as to be able to be opened and hermetically closed;
   a pressure reducing means connected to said pressure adjusting chamber for rapidly reducing pressure in said pressure adjusting chamber;
   an air-permeable forming mold in said pressure adjusting chamber; and
   an injection machine comprising a cylinder having a narrow opening at a front portion thereof, said cylinder being for heating and fluidizing biodegradable resin such that moisture is trapped therein, forcibly transferring the biodegradable resin toward said narrow opening, and extruding the biodegradable resin therefrom into said air-permeable forming mold so as to rapidly release the biodegradable resin from heat and pressure in said cylinder, whereby the biodegradable resin is foamed by an expansion force due to the vaporization of the moisture.

2. The apparatus of claim 1, wherein said pressure reducing means comprises a pressure reducing pump.

3. The apparatus of claim 2, wherein said pressure reducing means further comprises a pressure reducing valve connected between said pump and said pressure adjusting chamber.

4. The apparatus of claim 1, and further comprising an air introducing means for introducing air into said pressure adjusting chamber such that said pressure adjusting chamber is returned to atmospheric pressure.

5. The apparatus of claim 4, wherein said air introducing means comprises an atmospheric pressure releasing valve.

6. An apparatus for producing a biodegradable resin foam, comprising:
- a pressure adjusting chamber constructed so as to be able to be opened and hermetically closed;
- a pressure reducing means connected to said pressure adjusting chamber for rapidly reducing pressure in said pressure adjusting chamber;
- an air-permeable forming mold in said pressure adjusting chamber; and
- an injection machine comprising a cylinder having a narrow opening at a front portion thereof, said cylinder being for heating and fluidizing biodegradable resin such that moisture is trapped therein, forcibly transferring the biodegradable resin toward said narrow opening, and extruding the biodegradable resin therefrom into said air-permeable forming mold so as to rapidly release the biodegradable resin from heat and pressure in said cylinder, whereby the biodegradable resin is foamed by an expansion force due to the vaporization of the moisture;
- wherein said pressure adjusting chamber, said pressure reducing means and said air-permeable forming mold together define a means for enabling gas to escape from said air-permeable forming mold into said pressure adjusting chamber.

7. The apparatus of claim 6, wherein said pressure reducing means further comprises a pressure reducing valve connected between said pump and said pressure adjusting chamber.

8. The apparatus of claim 6, and further comprising an air introducing means for introducing air into said pressure adjusting chamber such that said pressure adjusting chamber is returned to atmospheric pressure.

9. The apparatus of claim 8, wherein said air introducing means comprises an atmospheric pressure releasing valve.

10. The apparatus of claim 6, wherein said pressure adjusting chamber comprises a door.

11. The apparatus of claim 6, wherein said air-permeable forming mold comprises first and second mold parts that are moveable away from each other, one of said first and second mold parts being moveable together with said door.

12. An apparatus as defined in claim 1, wherein said injection machine includes:
- a forcible transfer mechanism for forcibly transferring a biodegradable resin starting material containing biodegradable resin charged in said cylinder and raising a temperature of the biodegradable resin, to thereby fluidize and extrude the fluidized biodegradable resin through said narrow opening into said forming mold; and
- an access mechanism for reciprocating said narrow opening and forming mold relative to each other and retracting said narrow opening relative to said forming mold during injection of the fluidized biodegradable resin through said narrowed opening into said forming mold.

13. An apparatus as defined in claim 2, wherein said injection machine includes:
- a forcible transfer mechanism for forcibly transferring a biodegradable resin starting material containing biodegradable resin charged in said cylinder and raising a temperature of the biodegradable resin, to thereby fluidize and extrude the fluidized biodegradable resin through said narrow opening into said forming mold; and
- an access mechanism for reciprocating said narrow opening and forming mold relative to each other and retracting said narrow opening relative to said forming mold during injection of the fluidized biodegradable resin through said narrowed opening into said forming mold.

14. An apparatus as defined in claim 3, wherein said injection machine includes:
- a forcible transfer mechanism for forcibly transferring a biodegradable resin starting material containing biodegradable resin charged in said cylinder and raising a temperature of the biodegradable resin, to thereby fluidize and extrude the fluidized biodegradable resin through said narrow opening into said forming mold; and
- an access mechanism for reciprocating said narrow opening and forming mold relative to each other and retracting said narrow opening relative to said forming mold during injection of the fluidized biodegradable resin through said narrowed opening into said forming mold.

15. An apparatus as defined in claim 4, wherein said injection machine includes:
- a forcible transfer mechanism for forcibly transferring a biodegradable resin starting material containing biodegradable resin charged in said cylinder and raising a temperature of the biodegradable resin, to thereby fluidize and extrude the fluidized biodegradable resin through said narrow opening into said forming mold; and
- an access mechanism for reciprocating said narrow opening and forming mold relative to each other and retracting said narrow opening relative to said forming mold during injection of the fluidized biodegradable resin through said narrowed opening into said forming mold.

* * * * *